(12) United States Patent
Watanabe et al.

(10) Patent No.: US 10,012,833 B2
(45) Date of Patent: Jul. 3, 2018

(54) DISPLAYING APPARATUS INCLUDING OPTICAL IMAGE PROJECTION SYSTEM AND TWO PLATE-SHAPED OPTICAL PROPAGATION SYSTEMS

(71) Applicant: OLYMPUS CORPORATION, Hachioji-shi, Tokyo (JP)

(72) Inventors: Satoshi Watanabe, Tokyo (JP); Toshiaki Suzuki, Tokyo (JP); Kanto Miyazaki, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/217,193

(22) Filed: Jul. 22, 2016

(65) Prior Publication Data
US 2016/0327852 A1     Nov. 10, 2016

Related U.S. Application Data

(63) Continuation of application No. PCT/JP2015/000348, filed on Jan. 27, 2015.

(30) Foreign Application Priority Data

Jan. 27, 2014  (JP) ................................. 2014-012443

(51) Int. Cl.
*G02B 21/00*     (2006.01)
*G02B 27/00*     (2006.01)
(Continued)

(52) U.S. Cl.
CPC ..... *G02B 27/0081* (2013.01); *G02B 27/0172* (2013.01); *G02B 27/4277* (2013.01);
(Continued)

(58) Field of Classification Search
CPC .. G02B 27/0081; G02B 27/0172; G02B 6/00; G02B 6/0035; G02B 27/4277; G03B 21/208; G03B 21/28
See application file for complete search history.

(56) References Cited

U.S. PATENT DOCUMENTS 7,457,040 B2 * 11/2008 Amitai ................. G02B 6/0018
345/7
7,576,916 B2 *  8/2009 Amitai ................. G02B 6/0018
345/6

(Continued)

FOREIGN PATENT DOCUMENTS

JP       2006003872 A    1/2006
JP       2007505353 A    3/2007
(Continued)

OTHER PUBLICATIONS

International Search Report (ISR) dated Apr. 21, 2015 issued in International Application No. PCT/JP2015/000348.
(Continued)

*Primary Examiner* — Bao-Luan Le
(74) *Attorney, Agent, or Firm* — Holtz, Holtz & Volek PC

(57) ABSTRACT

A display apparatus includes an optical image projection system, first optical propagation system, and second optical propagation system. The optical image projection system projects image light to infinity. The first optical propagation system propagates the image light projected from the optical image projection system in the x-direction. The first optical propagation system deflects a portion of the image light. The second optical propagation system includes a second input deflector that deflects the image light deflected by the first output deflector. The second optical propagation system propagates the image light deflected by the second input deflector in the y-direction and deflects a portion of the image light. The light beam width in the y-direction of the (Continued)

image light emitted from the optical image projection system and the length in the y-direction of the first light guide are greater than the length in the y-direction of the second input deflector.

4 Claims, 24 Drawing Sheets

(51) Int. Cl.
| | |
|---|---|
| G02B 27/01 | (2006.01) |
| G02B 27/42 | (2006.01) |
| H04N 9/31 | (2006.01) |
| G03B 21/14 | (2006.01) |
| G03B 21/32 | (2006.01) |
| G02B 27/48 | (2006.01) |
| G03B 21/20 | (2006.01) |
| G03B 21/28 | (2006.01) |
| F21V 8/00 | (2006.01) |
| G02B 6/00 | (2006.01) |

(52) U.S. Cl.
CPC ............ *G02B 27/48* (2013.01); *G03B 21/14* (2013.01); *G03B 21/208* (2013.01); *G03B 21/28* (2013.01); *G03B 21/32* (2013.01); *H04N 9/3152* (2013.01); *H04N 9/3155* (2013.01); *H04N 9/3161* (2013.01); *G02B 6/00* (2013.01); *G02B 6/0035* (2013.01)

(56) References Cited

U.S. PATENT DOCUMENTS

| | | | | |
|---|---|---|---|---|
| 7,724,441 B2* | 5/2010 | Amitai | ................ | G02B 6/0018 250/227.11 |
| 8,004,765 B2* | 8/2011 | Amitai | ................ | G02B 6/0018 359/618 |
| 8,107,023 B2* | 1/2012 | Simmonds | ......... | G02B 27/0081 345/7 |
| 8,107,780 B2* | 1/2012 | Simmonds | ......... | G02B 27/0081 349/11 |
| 8,369,019 B2* | 2/2013 | Baker | ................ | G02B 6/0028 359/630 |
| 8,493,662 B2* | 7/2013 | Noui | ................ | G02B 6/0035 349/11 |
| 9,081,178 B2* | 7/2015 | Simmonds | ........... | G02B 6/0028 |
| 9,465,213 B2* | 10/2016 | Simmonds | ............... | G02B 6/34 |
| 2005/0180687 A1* | 8/2005 | Amitai | ................ | G02B 6/0018 385/31 |
| 2006/0126179 A1 | 6/2006 | Levola | | |
| 2007/0070859 A1 | 3/2007 | Hirayama | | |
| 2007/0091445 A1 | 4/2007 | Amitai | | |
| 2007/0097513 A1 | 5/2007 | Amitai | | |
| 2008/0158685 A1* | 7/2008 | Amitai | ................ | G02B 6/0018 359/630 |
| 2008/0285140 A1 | 11/2008 | Amitai | | |
| 2009/0052046 A1* | 2/2009 | Amitai | ................ | G02B 6/0018 359/629 |
| 2009/0097127 A1* | 4/2009 | Amitai | ................ | G02B 6/0018 359/633 |
| 2009/0190222 A1* | 7/2009 | Simmonds | ........... | G02B 6/0028 359/567 |
| 2010/0246003 A1* | 9/2010 | Simmonds | ......... | G02B 27/0081 359/567 |
| 2010/0246004 A1* | 9/2010 | Simmonds | ......... | G02B 27/0081 359/567 |
| 2011/0026128 A1* | 2/2011 | Baker | ................ | G02B 6/0028 359/630 |
| 2011/0176218 A1* | 7/2011 | Noui | ................ | G02B 6/0035 359/633 |
| 2011/0235179 A1* | 9/2011 | Simmonds | ............... | G02B 6/34 359/567 |
| 2014/0192418 A1 | 7/2014 | Suzuki | | |

FOREIGN PATENT DOCUMENTS

| | | |
|---|---|---|
| JP | 2008523434 A | 7/2008 |
| JP | 2013061480 A | 4/2013 |
| WO | 2006025317 A1 | 3/2006 |

OTHER PUBLICATIONS

Japanese Office Action dated Sep. 1, 2015 issued in counterpart Japanese Application No. 2014-012443.

* cited by examiner

FIG. 11
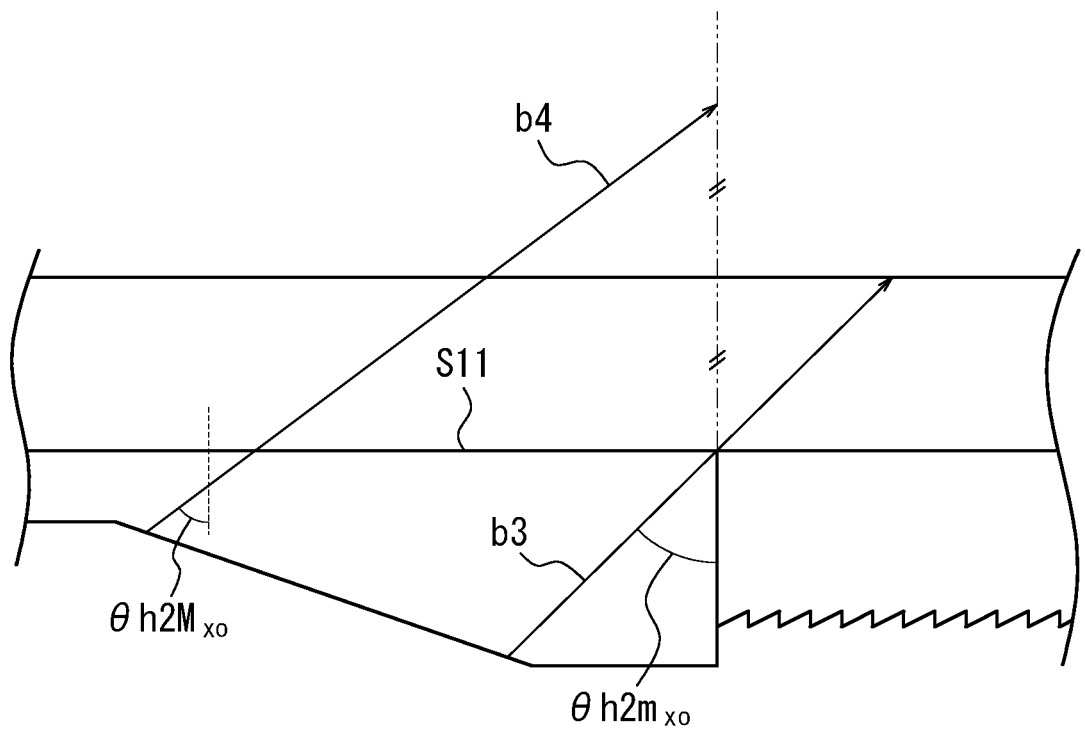
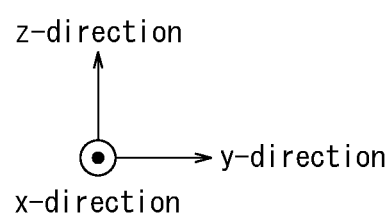

FIG. 14
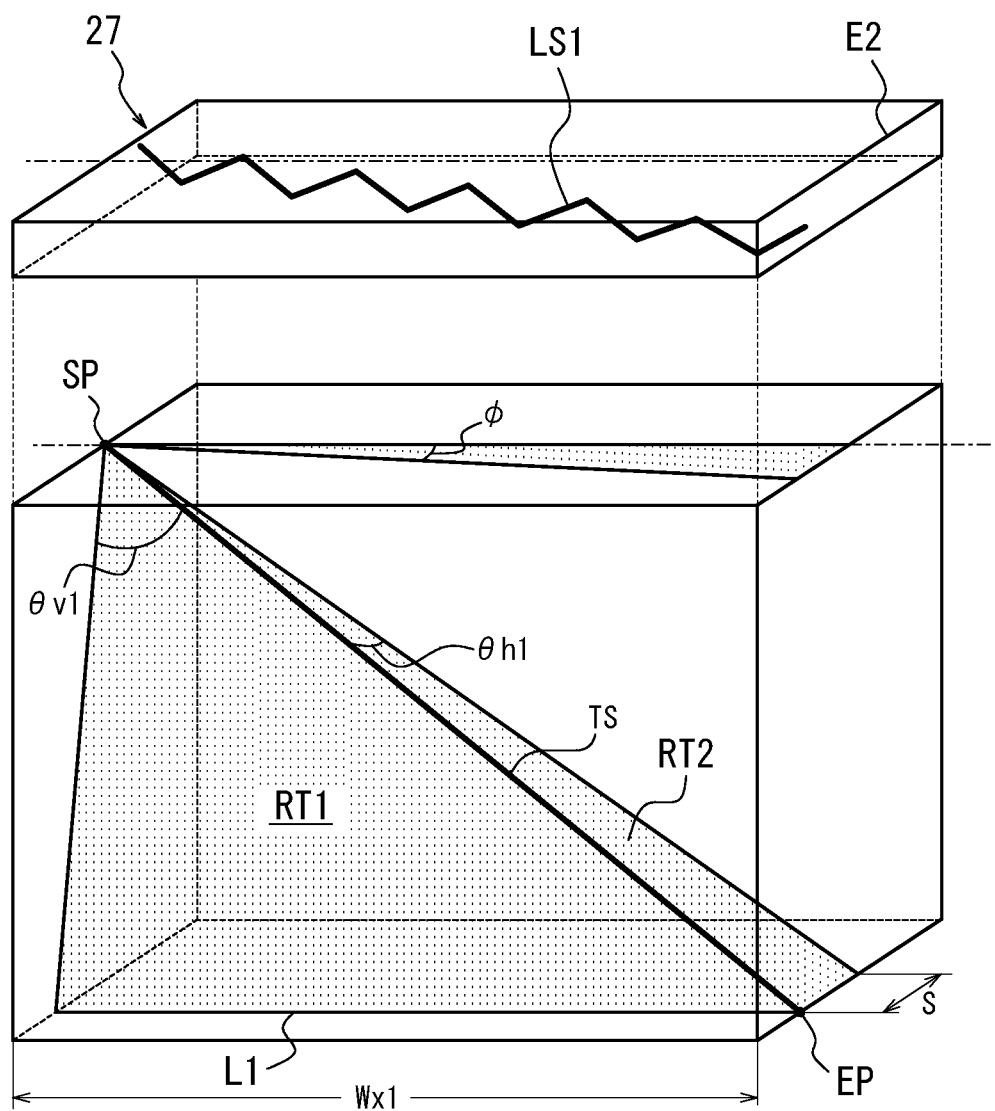
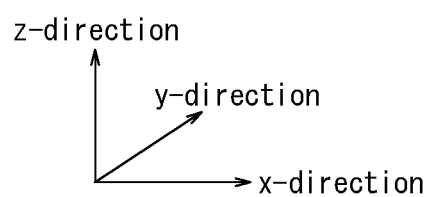

FIG. 19
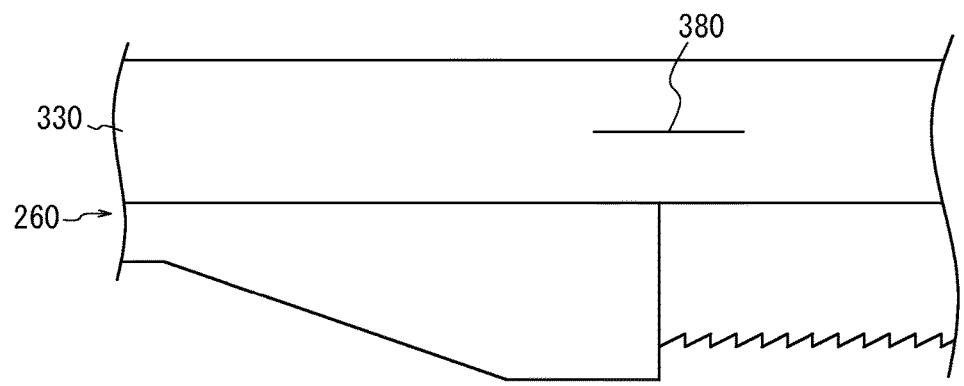
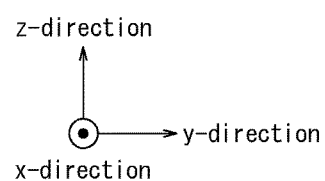

FIG. 22
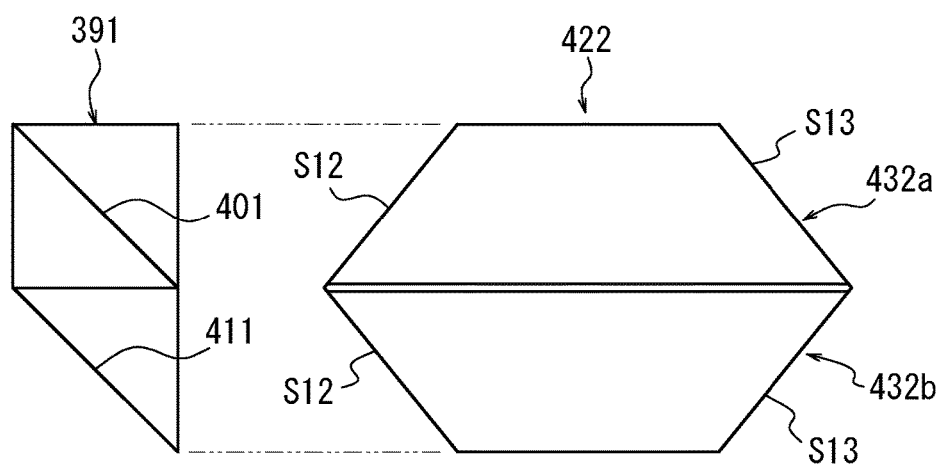
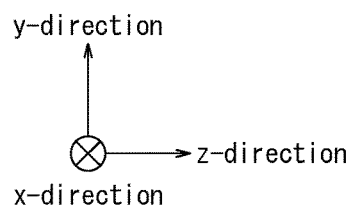

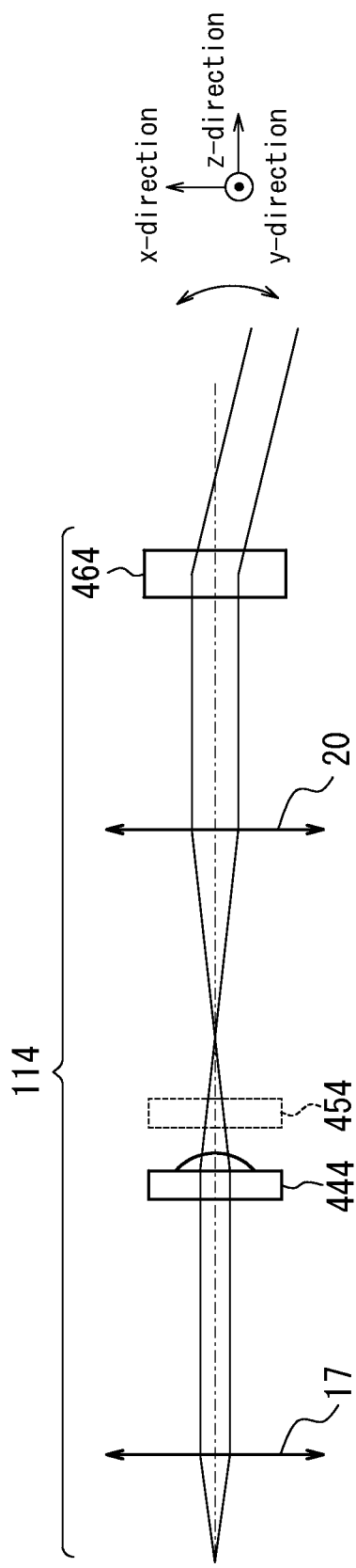
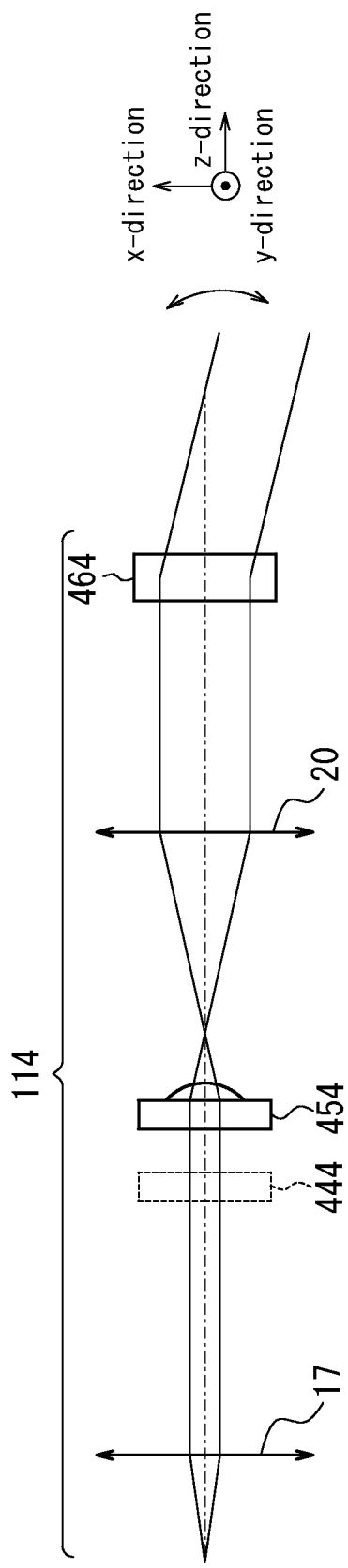

DISPLAYING APPARATUS INCLUDING OPTICAL IMAGE PROJECTION SYSTEM AND TWO PLATE-SHAPED OPTICAL PROPAGATION SYSTEMS

CROSS-REFERENCE TO RELATED APPLICATION

The present application is a Continuing Application based on International Application PCT/JP2015/000348 filed on Jan. 27, 2015, which in turn claims priority to Japanese Patent Application No. 2014-012443 filed on Jan. 27, 2014, the entire disclosure of these earlier applications being incorporated herein by reference.

TECHNICAL FIELD

This disclosure relates to a display apparatus that projects an image by enlarging an exit pupil.

BACKGROUND

A variety of display apparatuses are known as examples of projection displays that display a projected image. In order to observe the projected image, the observer needs to align the eye with the exit pupil of the optical projection system. Therefore, to allow observation of the projected image at a variety of positions, the exit pupil is preferably made large. One proposed display apparatus enlarges the pupil in two dimensions by including two optical elements that enlarge the pupil in any one direction and are provided orthogonal to each other (see JP 2013-061480 A (PTL 1)).

CITATION LIST

Patent Literature

PTL 1: JP 2013-061480 A

SUMMARY

A display apparatus according to this disclosure includes:
an optical image projection system configured to project image light corresponding to an image to infinity;
a plate-shaped first optical propagation system including two opposing surfaces and configured to propagate the image light projected from the optical image projection system in an x-direction perpendicular to a direction of an optical axis of the optical image projection system while repeatedly reflecting the image light between the two opposing surfaces and configured to deflect a portion of the image light in a direction substantially perpendicular to one surface of the two opposing surfaces; and
a plate-shaped second optical propagation system including two opposing surfaces and including a second input deflector configured to deflect the image light deflected by the first optical propagation system, the second optical propagation system being configured to propagate the image light deflected by the second input deflector in a y-direction perpendicular to both the direction of the optical axis of the optical image projection system and the x-direction while repeatedly reflecting the image light between the two opposing surfaces and configured to deflect a portion of the image light in a direction substantially perpendicular to one surface of the two opposing surfaces;
wherein a light beam width in the y-direction of the image light emitted from the optical image projection system and a length in the y-direction of the first optical propagation system are greater than a length in the y-direction of the second input deflector.

BRIEF DESCRIPTION OF THE DRAWINGS

In the accompanying drawings:
FIG. 11 is an expanded side view of the second optical propagation system in order to illustrate the angle of a light ray that can be emitted by a second output deflector;
FIG. 14 illustrates the trajectory, extended linearly, of a light beam propagating in the x-direction within the first light guide.

FIG. 19 is a side view of the second optical propagation system in Embodiment 2;

FIG. 22 is a structural diagram illustrating a third modification to the optical image projection system;

FIGS. 24A and 24B are structural diagrams illustrating a fifth modification to the optical image projection system.

DETAILED DESCRIPTION

The following describes embodiments with reference to the drawings.

Figure 1:
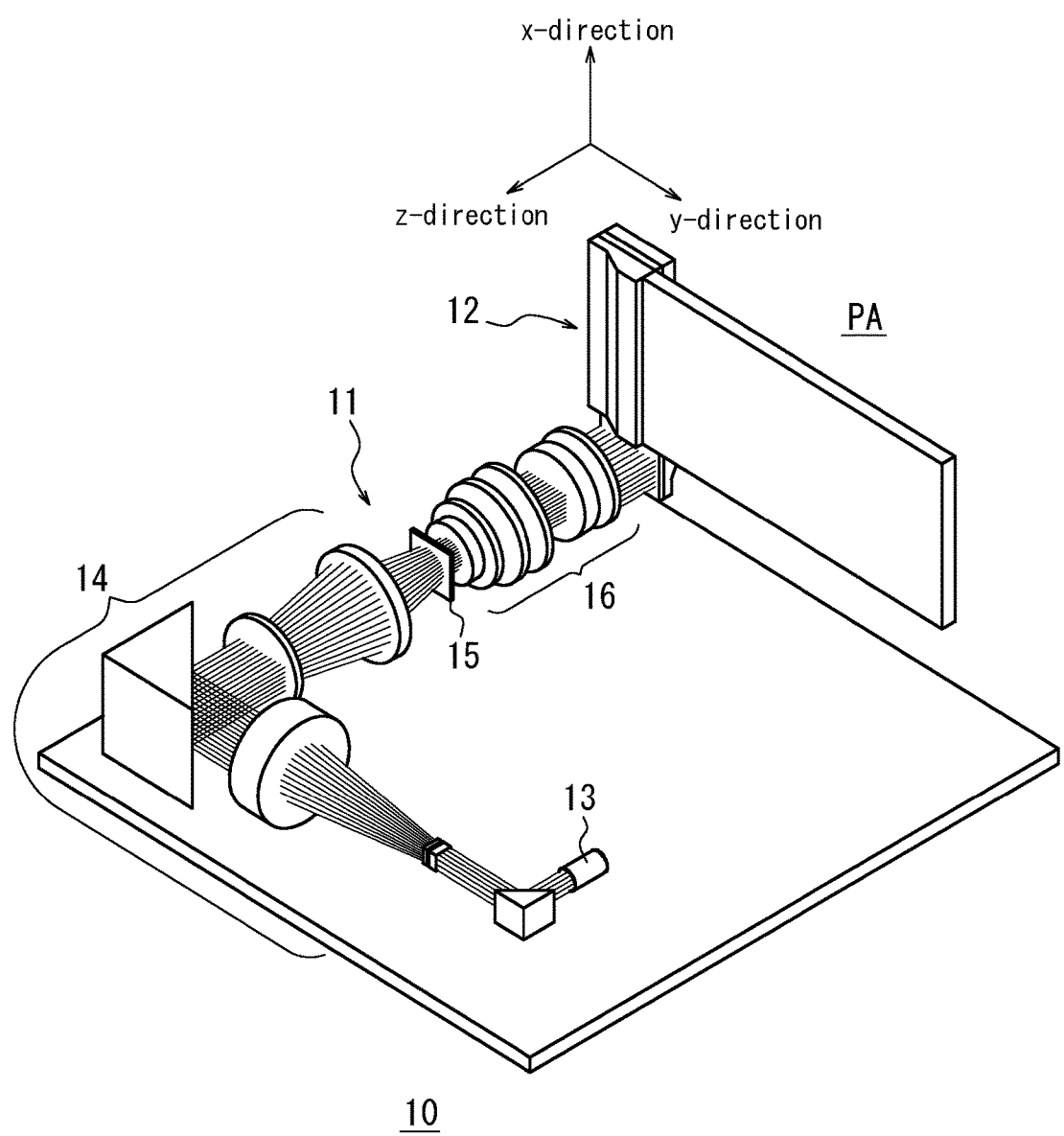
FIG. 1 is a perspective view of a display apparatus according to Embodiment 1.

FIG. 1 is a perspective view of a display apparatus according to Embodiment 1.

As illustrated in FIG. 1, a display apparatus 10 includes an optical image projection system 11 and a pupil enlarging optical system 12. In this embodiment, the direction along the optical axis of the optical image projection system 11 is treated as the z-direction, and the directions perpendicular to the z-direction and perpendicular to each other are treated as the x-direction (first direction) and the y-direction (second direction). In FIG. 1, the upward direction is the x-direction. Furthermore, near the pupil enlarging optical system 12 in FIG. 1, the direction diagonally downward to the right is the y-direction, and the direction diagonally downward to the left is the z-direction.

The optical image projection system 11 projects image light corresponding to an image to infinity. The pupil enlarging optical system 12 receives the image light projected by the optical image projection system 11, enlarges the exit pupil, and emits the result. By aligning the eye with any location in a projection area PA of the enlarged exit pupil, the observer can observe an image.

Next, the structure of the optical image projection system 11 is described. The optical image projection system 11 includes a light source 13, an optical illumination system 14, a transmissive chart 15, and an optical projection system 16.

The light source 13 is driven by a light source driver (not illustrated) and emits a laser as illumination light using power supplied by a battery (not illustrated). The wavelength of the laser is, for example, 532 nm.

Figure 2A:
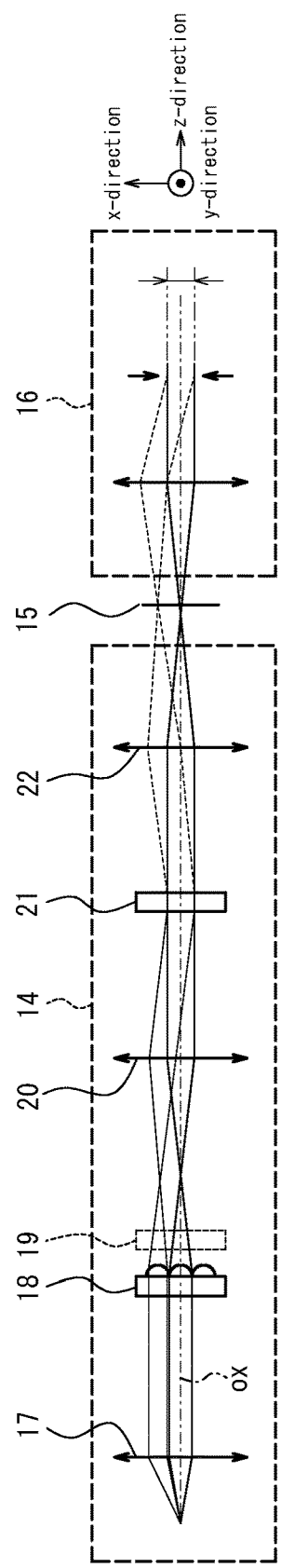
FIGS. 2A and 2B are structural diagrams schematically illustrating the structure of the optical image projection system in FIG. 1.
Figure 2B:
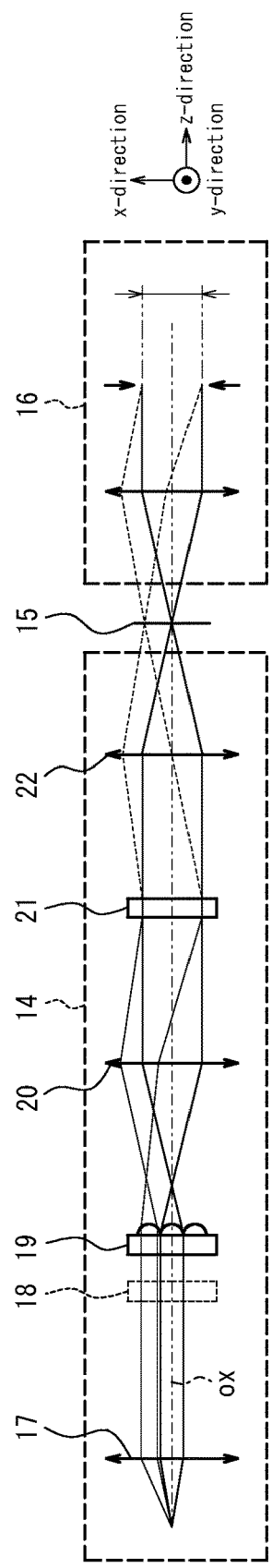

As illustrated in FIGS. 2A and 2B, the optical illumination system 14 includes a collimator lens 17, a first lenticular lens 18, a second lenticular lens 19, a first lens 20, a diffuser panel 21, and a second lens 22. The collimator lens 17, first lenticular lens 18, second lenticular lens 19, first lens 20, diffuser panel 21, and second lens 22 are optically joined.

The collimator lens 17 converts the illumination light exiting from the light source 13 into parallel light.

The first lenticular lens 18 includes a plurality of lens elements with a shorter lens pitch than the width of the light beam of the illumination light exiting from the collimator lens 17, for example 0.1 mm to 0.5 mm, and is configured so that the entering parallel light beam extends across a plurality of lens elements. The first lenticular lens 18 has a refractive power in the x-direction and diffuses illumination light converted to a parallel light beam along the x-direction.

The second lenticular lens 19 has a shorter focal length than does the first lenticular lens 18. For example, the focal length of the first lenticular lens 18 and the second lenticular lens 19 may respectively be 1.6 mm and 0.8 mm. The second lenticular lens 19 is disposed so that the back focal positions of the first lenticular lens 18 and the second lenticular lens 19 substantially match. The second lenticular lens 19 includes a plurality of lens elements with a shorter lens pitch than the width of the light beam of the illumination light exiting from the collimator lens 17, for example 0.1 mm to 0.5 mm, and is configured so that the entering parallel light beam extends across a plurality of lens elements. The second lenticular lens 19 has a refractive power in the y-direction and diffuses illumination light that was diffused in the x-direction along the y-direction. A lenticular lens with an angle of diffusion in the y-direction larger than the angle of diffusion in the x-direction of the first lenticular lens 18 is used as the second lenticular lens 19.

The first lens 20 is disposed so that the front focal position of the first lens 20 substantially matches the back focal positions of the first lenticular lens 18 and the second lenticular lens 19. The focal length of the first lens 20 may, for example, be 50 mm. Accordingly, the first lens 20 converts illumination light components exiting from the plurality of lenses of the second lenticular lens 19 into parallel light beams with different exit angles and emits the parallel light beams.

The diffuser panel 21 is disposed to match the back focal position of the first lens 20 substantially. Accordingly, the plurality of parallel light beams exiting from the first lens 20 irradiate the diffuser panel 21 in a convoluted state. As a result, the irradiation light irradiated on the diffuser panel 21 is rectangular, with a wider light beam width in the y-direction than in the x-direction, and has an intensity distribution yielded by making a laser with a Gaussian intensity distribution approximately uniform. The diffuser panel 21 is driven by a diffusion panel driving mechanism (not illustrated), vibrates in a plane perpendicular to the optical axis OX, and reduces the visibility of speckles. The diffuser panel 21 may, for example, be a holographic diffuser designed to have a rectangular diffusion angle and diffuses illumination light exiting from the diffuser panel 21 so as to irradiate the entire area of the below-described rectangular transmissive chart 15 with a uniform intensity and without excess or deficiency.

The second lens 22 is disposed so that the front focal position of the second lens 22 substantially matches the position of the diffuser panel 21. The focal length of the second lens 22 may, for example, be 26 mm. The second lens 22 focuses, at each angle, the illumination light that is incident at a variety of angles.

The transmissive chart 15 is disposed at the back focal position of the second lens 22. The transmissive chart 15 may, for example, be a rectangle with a length of 5.6 mm in the x-direction and a length of 4.5 mm in the y-direction. The transmissive chart 15 is driven by a chart driver (not illustrated) and forms any image to be displayed by the display apparatus 10. The pixels constituting the image of the transmissive chart 15 are irradiated by the parallel light beams focused at respective angles. Accordingly, the light passing through the pixels constitutes image light.

The optical projection system 16 is disposed so that the exit pupil of the optical projection system 16 and the diffuser panel 21 are optically conjugate. Accordingly, the exit pupil has a rectangular shape that is longer in y-direction than in the x-direction. The focal length of the optical projection system 16 is, for example, 28 mm, and the image light projected through the transmissive chart 15 is projected to infinity. As image light, the optical projection system 16 emits a group of parallel light beams having angular components in the x-direction and the y-direction corresponding to the position in the x-direction and the y-direction of the pixels of the transmissive chart 15, i.e. the object height from the optical axis OX. In this embodiment, for example the light beams exit in an angular range of ±14.6° in the x-direction and ±5.70 in the y-direction. The image light projected by the optical projection system 16 enters the pupil enlarging optical system 12.

Figure 3:
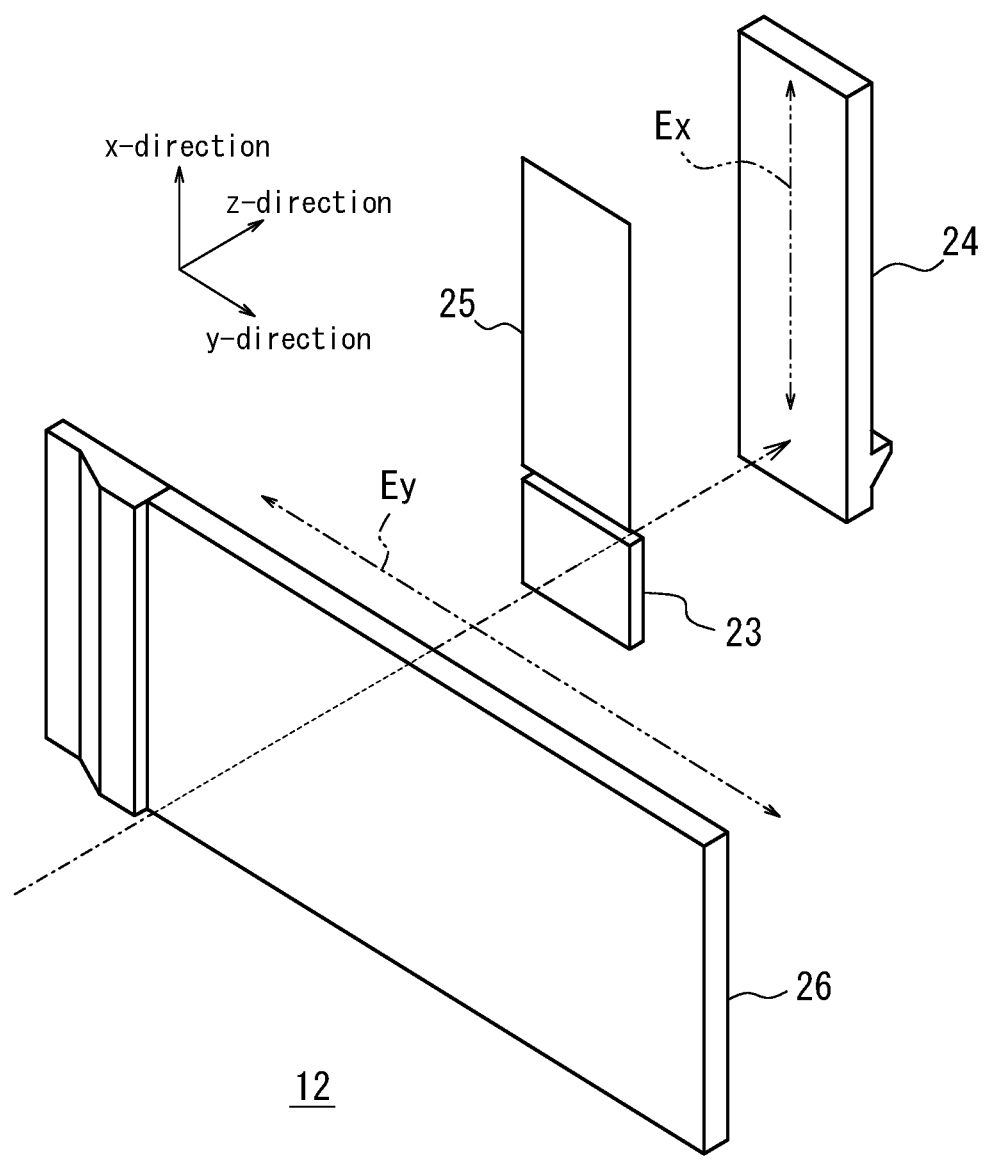
FIG. 3 is a perspective view displaying the structural components of the pupil enlarging optical system in FIG. 1 separated from each other.

Next, the structure of the pupil enlarging optical system 12 is described with reference to FIG. 3. The pupil enlarging optical system 12 includes a polarizer 23, a first optical propagation system 24, a half-wavelength plate 25, and a second optical propagation system 26. In FIG. 3, for the sake of illustration, the polarizer 23, first optical propagation system 24, half-wavelength plate 25, and second optical propagation system 26 are displayed as being widely separated, but these components are actually arranged in close proximity, as illustrated in FIG. 1.

The polarizer 23 is disposed between the exit pupil of the optical projection system 16 and the optical projection system 16, receives the image light exiting from the optical projection system 16, and emits s-polarized light. The first optical propagation system 24 is disposed so that the area of incidence (not illustrated in FIG. 3) of a second planar surface (not illustrated in FIG. 3) of the below-described first light guide (not illustrated in FIG. 3) and the exit pupil of the optical projection system 16 are combined. The first optical propagation system 24 expands, in the x-direction, the exit pupil projected as s-polarized light by the polarizer 23 and emits the result (see reference sign "Ex"). The half-wavelength plate 25 rotates, by 900, the polarization plane of the image light expanded in the x-direction. By rotating the polarization plane 90°, the image light can be caused to enter the first polarizing beam splitter film (not illustrated in FIG. 3) of the second optical propagation system 26 as s-polarized light. The second optical propagation system 26 expands the image light, the polarization plane of which was rotated by the half-wavelength plate 25, in the y-direction and emits the result (see reference sign "Ey").

Figure 4:
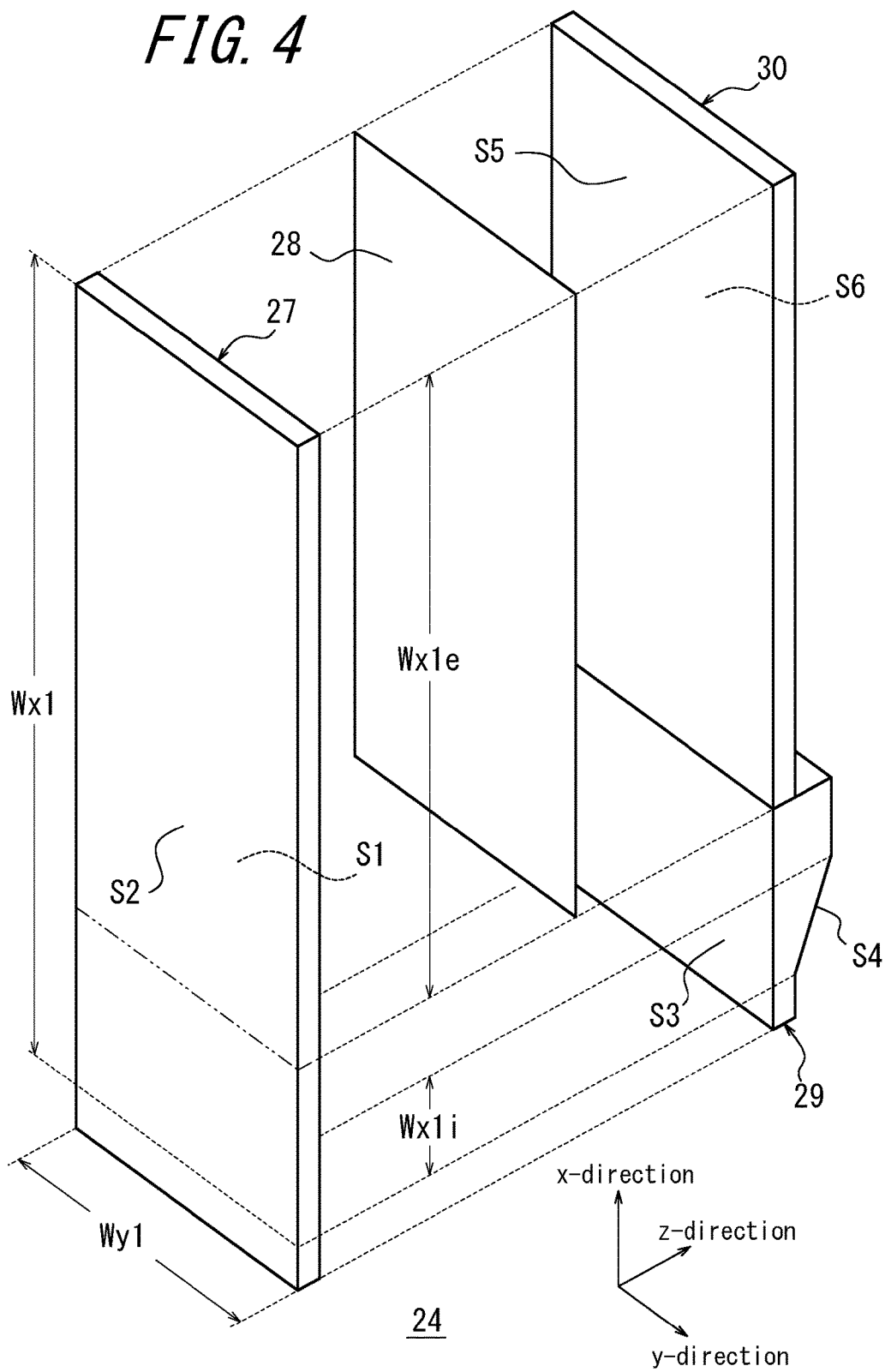
FIG. 4 is a perspective view displaying the structural components of the first optical propagation system in FIG. 3 separated from each other.

Next, the function by which the first optical propagation system 24 expands the exit pupil is described along with the structure of the first optical propagation system 24. As illustrated in FIG. 4, the first optical propagation system 24 includes a first light guide 27, a first polarizing beam splitter film 28, a first input deflector 29, and a first output deflector 30. The first polarizing beam splitter film 28 is vapor deposited on the first light guide 27, as described below, and cannot be separated from the first light guide 27, but these components are illustrated schematically in FIG. 4 as being separated.

The first light guide 27 is a flat plate with transmittivity having a first planar surface S1 (a first surface) and a second planar surface S2 (a second surface) that are parallel and oppose each other. The first input deflector 29 is a prism that has a planar input side bonded surface S3 and an inclined surface S4 that is inclined relative to the input side bonded surface S3. The first output deflector 30 is a plate-shaped member with transmittivity having an output side bonded surface S5 and, on the back side, a triangular prism array surface S6 on which a triangular prism array is formed.

In a partial area of the first planar surface S1 of the first light guide 27, the first polarizing beam splitter film 28 is formed by vapor deposition to have substantially the same size as the output side bonded surface S5 of the first output deflector 30. The first output deflector 30 is bonded at the output side bonded surface S5 by transparent adhesive to the area of the first planar surface S1 in which the first polarizing beam splitter film 28 is formed. The first input deflector 29 is bonded at the input side bonded surface S3 by transparent adhesive to the area of the first planar surface S1 other than the area in which the first polarizing beam splitter film 28 is formed. The first optical propagation system 24 is integrated by the first light guide 27 being bonded to the first output deflector 30 and the first input deflector 29. Hereinafter, in the longitudinal direction of the first optical propagation system 24 (the "x-direction" in FIG. 4), the area in which the first input deflector 29 is provided is referred to as the area of incidence, and the area in which the first output deflector 30 is provided is referred to as the exit area (see FIG. 5). As described below, the first polarizing beam splitter film 28 is preferably formed so as to protrude slightly to the area of incidence side.

The integrated first optical propagation system 24 is a flat plate, and the lengths Wx1 and Wy1 respectively in the length direction (the "x-direction" in FIG. 4) and the width direction (the "y-direction" in FIG. 4) of the first optical propagation system 24 and the first light guide 27 may, for example, be 60 mm and 20 mm. The length Wx1e of the first polarizing beam splitter film 28 in the longitudinal direction may, for example, be 50 mm. The length Wx1i of the first input deflector 29 in the longitudinal direction may, for example, be 7 mm. As illustrated in FIG. 4, the first input deflector 29 may include a section with a surface other than the inclined surface S4 as a surface that faces the input side bonded surface S3, but the length Wx1i of the first input deflector 29 in the longitudinal direction is the length of the inclined surface S4 in the longitudinal direction.

The first polarizing beam splitter film 28 is a multilayer film designed to transmit light that enters from a substantially perpendicular direction while reflecting the majority and transmitting the remainder of light that enters obliquely. A low-pass or band-pass thin film with spectral reflectance may have such properties.

Figure 6:
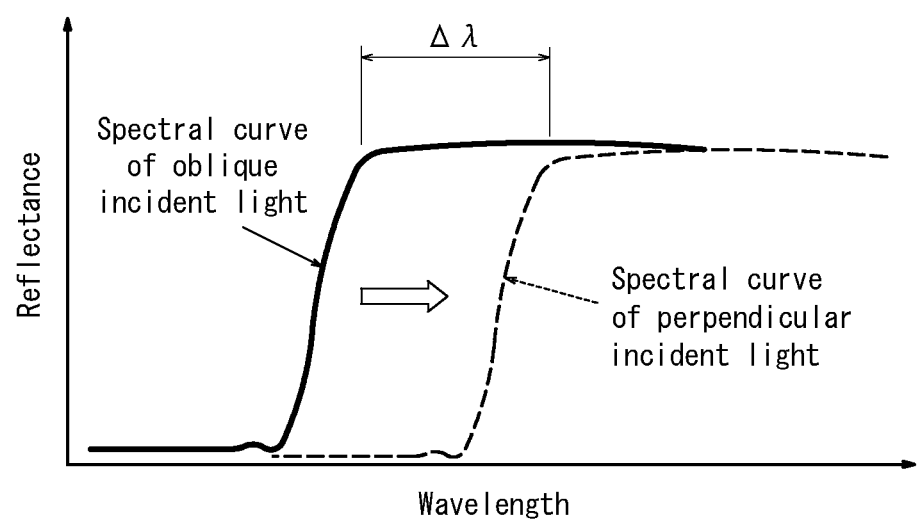
FIG. 6 is a graph illustrating the reflectance versus the wavelength of a thin film, in order to illustrate the property of the spectral curve of the thin film shifting along the wavelength direction depending on the angle of incidence.

As is known, the spectral curve shifts in the wavelength direction in accordance with the angle of incidence on a thin film. As illustrated in FIG. 6, the spectral curve (see the dashed line) with respect to approximately perpendicular incident light shifts in the longer wavelength direction from the spectral curve with respect to oblique incident light (see the solid line). The first polarizing beam splitter film 28 can be formed by combining the wavelength of the incident light beam Lx and the settings of the thin film so as to be sandwiched between the cutoff wavelengths of the spectral curve with respect to oblique incident light and the spectral curve with respect to approximately perpendicular incident light and so that the reflectance with respect to oblique incident light is 95% and the reflectance with respect to approximately perpendicular incident light is 0%.

Figure 7:
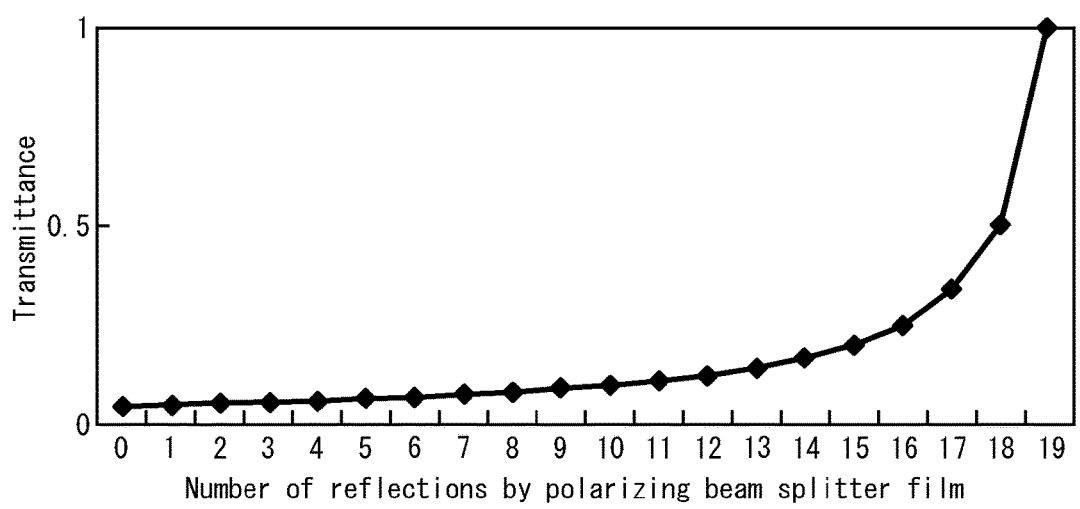
FIG. 7 is a graph illustrating the transmittance as a function of distance from an area of incidence on a first polarizing beam splitter film.

The first polarizing beam splitter film 28 has transmittance, with respect to oblique incident light, that changes in accordance with position along the x-direction. For example, the first polarizing beam splitter film 28 is formed so that the transmittance increases as a geometric progression (see FIG. 7) in accordance with distance from one end of the first polarizing beam splitter film 28 at the first input deflector 29 side. Such a film may be formed by vapor deposition by, for example, designing the process in advance so that the distance from the vapor deposition source changes in accordance with planar distance from the first input deflector 29, so as to yield desired reflectance properties at each position in accordance with the difference in distance (difference in thickness of the film that is formed).

Quartz (a transparent medium) for example having a thickness, i.e. a length in the z-direction, of 2 mm may be used as the first light guide 27 (see FIG. 4). Using quartz is advantageous in that the first light guide 27 has heat resistance with respect to heating when the first polarizing beam splitter film 28 is vapor deposited and does not warp easily under film stress, since quartz is a hard material.

An AR film 31 is formed on the second planar surface S2 of the first light guide 27. The AR film 31 suppresses reflectance of image light entering from the perpendicular direction. The AR film 31 is designed and formed so that the film stress thereof matches the film stress of the first polarizing beam splitter film 28. By causing the film stress to match, warping of the first optical propagation system 24 can be suppressed, contributing to good propagation of image light.

The first input deflector 29 is, for example, formed from quartz. By forming the first input deflector 29 from quartz, i.e. the same material as the first light guide 27, the reflectance at the interface between the input side bonded surface S3 and the first planar surface S1 can be reduced ideally.

Figure 5:
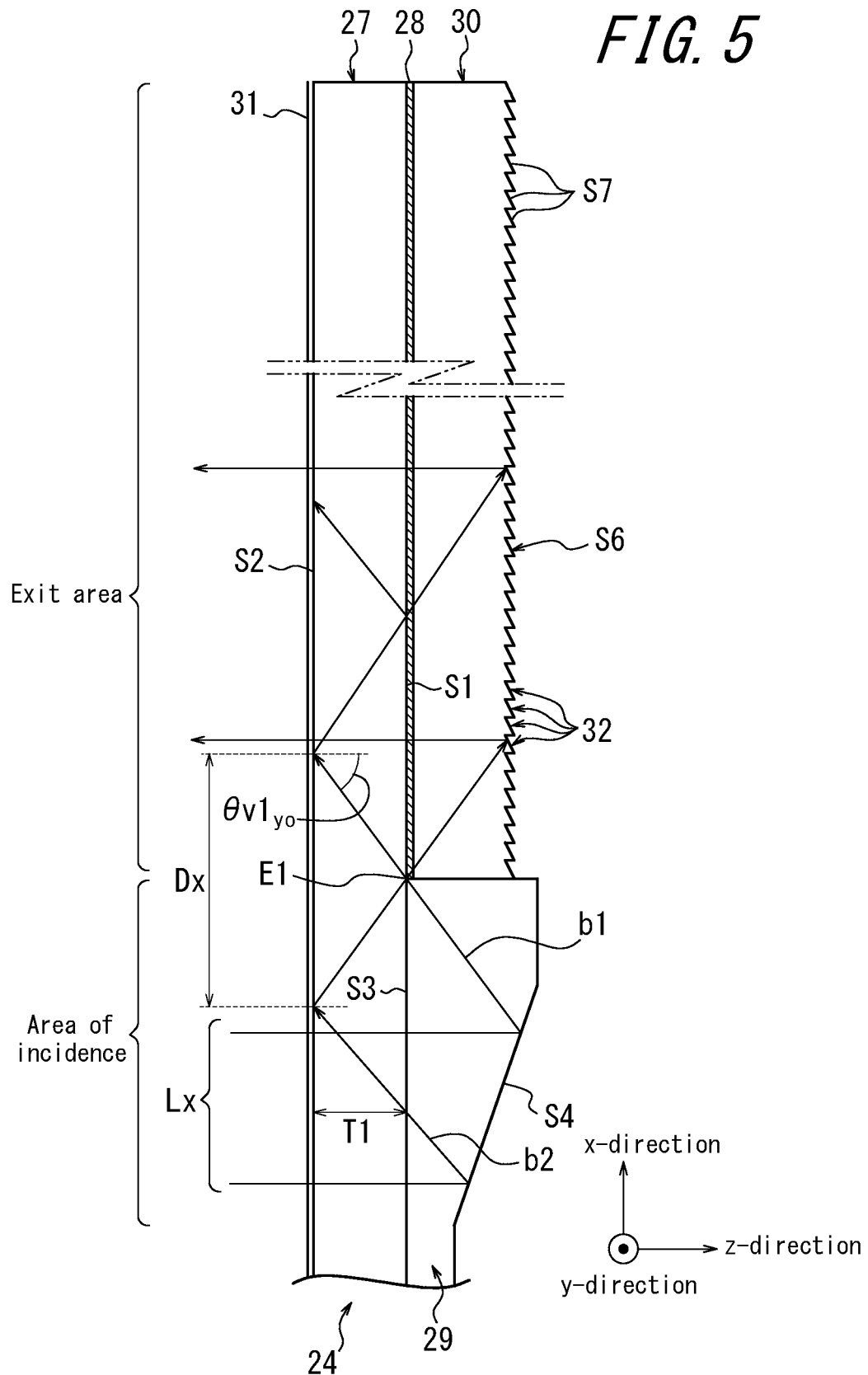
FIG. 5 is a side view of the first optical propagation system.

Aluminum is vapor deposited on the inclined surface S4 of the first input deflector 29 and functions as a reflecting film. As illustrated in FIG. 5, a normal line to the inclined surface S4 extends to the exit area side of the first light guide 27. Accordingly, a light beam incident perpendicularly on the second planar surface S2 of the first light guide 27 in the area of incidence is reflected by the inclined surface S4 inside the first input deflector 29 and propagates towards the exit area. The apex angle between the input side bonded surface S3 and the inclined surface S4 is described below. The interface between the first input deflector 29 and the first output deflector 30 is colored black and absorbs the incident light beam without reflecting the light beam.

The first output deflector 30 is, for example, formed by acrylic having a thickness of 3 mm. The triangular prism array formed on the first output deflector 30 is minute and is formed by mold injection. Acrylic, which can be formed by mold injection and is a transparent medium, has thus been selected as an example. Aluminum is vapor deposited on the triangular prism array surface S6 and functions as a reflecting film. The first output deflector 30 is formed by acrylic in this embodiment but is not limited to being acrylic resin. However, when the first output deflector 30 is joined on a planar surface with a film having properties in one polarization direction, like the first polarizing beam splitter film 28, a material and formation conditions that can suppress the occurrence of birefringence within the material are preferably taken into consideration.

On the triangular prism array surface S6 of the first output deflector 30, a plurality of triangular prisms 32 extending in the y-direction are formed. The triangular prisms 32 are aligned in the x-direction in saw-toothed fashion with a pitch of, for example, 0.9 mm.

The inclination angle of an inclined surface S7 of each triangular prism 32 relative to the output side bonded surface S5 is opposite from the inclination of the inclined surface S4 of the first input deflector 29, i.e. a normal line to the inclined surface S7 extends to the area of incidence side of the first light guide 27. The absolute value of the inclination angle of each triangular prism 32 is substantially equal to the inclination angle of the inclined surface S4 or differs over a range of a few degrees in accordance with the combination of materials used for the first input deflector 29, the first light guide 27, and the first output deflector 30. The difference in angle between adjacent prisms on the triangular prism array surface S6 is approximately 0.010 (0.5 min) or less.

The apex angle between the input side bonded surface S3 and the inclined surface S4 of the first input deflector 29 and the inclination angle of the triangular prisms 32 is determined based on the critical angle at the second planar surface S2 of the first light guide 27, as described below.

The first optical propagation system 24 is disposed so that a light beam Lx parallel to the optical axis OX of the optical image projection system 11 is incident from the outside perpendicularly on the area of incidence at the second planar surface S2. The light beam Lx incident perpendicularly on the area of incidence enters the first input deflector 29 from the first light guide 27 and is reflected diagonally by the inclined surface S4. The diagonally reflected light beam Lx passes through the inside of the first light guide 27 and is incident on the second planar surface S2. The apex angle between the input side bonded surface S3 and the inclined surface S4 of the first input deflector 29 and the inclination angle of the triangular prism 32 are determined so that the light beam Lx incident on the second planar surface S2 in the first light guide 27 is totally reflected.

Accordingly, the angle of incidence $\theta$ relative to the second planar surface S2 in the first light guide 27 needs to exceed the critical angle, i.e. the relationship $\theta$>critical angle=$\sin^{-1}(1/n)$ (where n is the refractive index of the first light guide 27) needs to hold. In this embodiment, the first light guide 27 is formed from quartz as described above, and therefore the critical angle is 43.6°.

With regard to the light beam at the object height that is incident perpendicularly from the optical image projection system 11, the angle of incidence $\theta$ on the second planar surface S2 inside the first light guide 27 is twice the inclination angle of the inclined surface S4 relative to the input side bonded surface S3 of the first input deflector 29. Hence, the inclination angle needs to be at least 21.8°. In this embodiment, the inclination angle is 25.8°, for example, which is at least 21.80. The inclination angle of each triangular prism 32 is, for example, 25°.

Based on the size of the transmissive chart 15 and the focal length of the optical projection system 16, the angle of the light ray incident on the area of incidence of the second planar surface S2 can be restricted. For example, the angle of the incident light ray can be restricted to be within a range of ±4.6° in the x-direction and ±5.70 in the y-direction on the air side and within a range of ±3.10 in the x-direction and ±3.9° in the y-direction in the medium of the first light guide 27 formed from quartz. With such an angle restriction, the light beam at the angle of image light corresponding to all object heights can be totally reflected at the second planar surface S2 in the first light guide 27 in the above-described first optical propagation system 24.

In the first optical propagation system 24 structured and arranged as described above, the light beam Lx incident perpendicularly on the area of incidence of the second planar surface S2 is reflected by the inclined surface S4 of the first input deflector 29 and is incident diagonally on the exit area of the second planar surface S2 inside the first light guide 27. A light beam Lx incident diagonally is incident on the second planar surface S2 at an angle exceeding the critical angle and is totally reflected. The totally reflected light beam Lx is incident diagonally on the first polarizing beam splitter film 28. Only a predetermined percentage of light is transmitted, and the remainder of the light is reflected. The light beam Lx reflected by the first polarizing beam splitter film 28 is incident again on the second planar surface S2 at an angle exceeding the critical angle and is totally reflected.

Subsequently, the light beam Lx propagates in the x-direction of the first light guide 27 while repeatedly being partially reflected at the first polarizing beam splitter film 28 and totally reflected at the second planar surface S2. Each time the light beam Lx is incident on the first polarizing beam splitter film 28, however, a predetermined percentage of the light beam Lx is transmitted and emitted to the first output deflector 30.

The light beam Lx emitted to the first output deflector 30 is once again deflected by the reflecting film on the inclined surface S7 of the triangular prism 32 in a direction perpendicular to the second planar surface S2 of the first light guide 27. The light beam Lx deflected in the perpendicular direction passes through the first polarizing beam splitter film 28 at a transmittance of substantially 100% and exits to the outside from the second planar surface S2.

The half-wavelength plate 25 (see FIG. 3) is formed into a shape substantially the same size as the exit area of the second planar surface S2. The half-wavelength plate 25 is disposed at a position opposite the exit area of the second planar surface S2, with a gap therebetween. Accordingly, the light beam incident on the second planar surface S2 in the first light guide 27 does not pass through the second planar surface S2, but rather total reflection is guaranteed. As described above, the half-wavelength plate 25 rotates the polarization plane of the light beam exiting from the first optical propagation system 24 by 90°.

Figure 8:
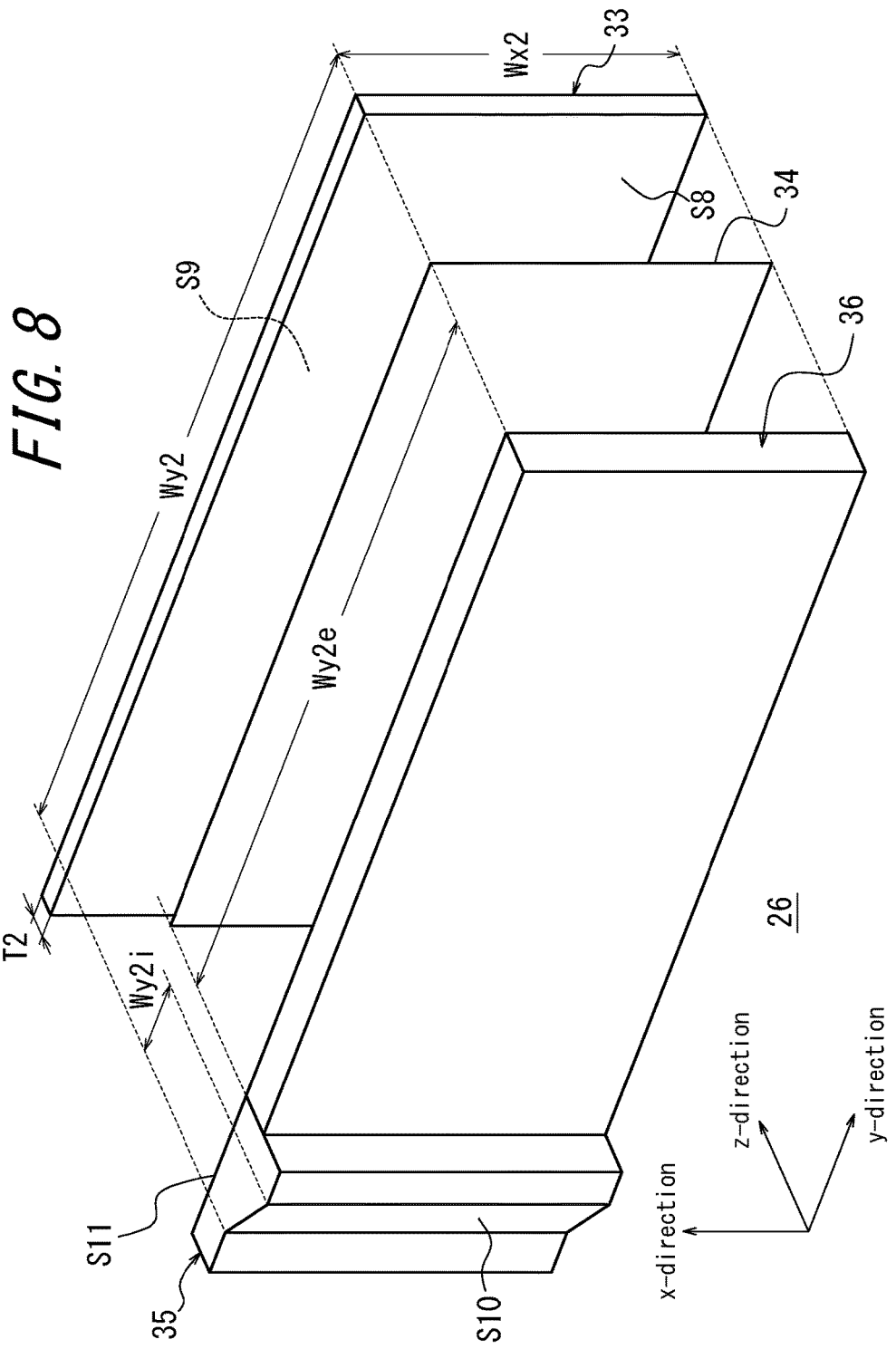
FIG. 8 is a perspective view displaying the structural components of the second optical propagation system in FIG. 3 separated from each other.

The structure of the second optical propagation system 26 other than the size and the arrangement thereof is the same as that of the first optical propagation system 24. As illustrated in FIG. 8, the second optical propagation system 26 includes a second light guide 33, a second polarizing beam splitter film 34, a second input deflector 35, and a second output deflector 36. Like the first optical propagation system 24, these constituent members are in the shape of an integrated flat plate, and the lengths Wx2 and Wy2 respectively in the width direction (the "x-direction" in FIG. 8) and the length direction (the "y-direction" in FIG. 8) of the second optical propagation system 26 and the second light guide 33 may, for example, be 50 mm and 110 mm. The length Wy2$i$ of the second polarizing beam splitter film 34 in the longitudinal direction in the second optical propagation system 26 may, for example, be 100 mm. The length Wy2$e$ of the second input deflector 35 in the longitudinal direction may, for example, be 10 mm. The second light guide 33, second polarizing beam splitter film 34, second input deflector 35, and second output deflector 36 are respectively similar in function to the first light guide 27, first polarizing beam splitter film 28, first input deflector 29, and first output deflector 30.

The second light guide 33 includes a third planar surface S8 (a third surface), on which the second polarizing beam splitter film 34 is vapor deposited, and a fourth planar surface S9 (a fourth surface) opposing the third planar surface S8. The second optical propagation system 26 is disposed so that the exit area of the second planar surface S2 of the first optical propagation system 24 and the area of incidence of the fourth planar surface S9 of the second optical propagation system 26 oppose each other, and so that the second optical propagation system 26 is rotated 90° with respect to the first optical propagation system 24 about an axis that is a line parallel to the z-direction (see FIG. 3). Accordingly, the second optical propagation system 26 expands the image light emitted from the first optical propagation system 24 in the y-direction and emits the result.

Next, the size of the first input deflector 29 is described below in detail. At the exit pupil copied in the x-direction by the first optical propagation system 24, brightness variation may occur depending on the observation position within the exit area of the second planar surface S2 and the angle of image light corresponding to object height. In order to reduce brightness variation, the area in which light can be reflected by the first input deflector 29, emitted to the first light guide 27, and totally reflected at the second planar surface S2 in the first light guide 27 to reach the first polarizing beam splitter film 28 is preferably filled by light beams.

As illustrated in FIG. 5, a light ray that is reflected by the first input deflector 29 and emitted to the first light guide 27 is, among light rays incident on the interface between the first input deflector 29 and the first light guide 27, a light ray that is incident further towards the first input deflector 29 than an end E1 along the x-direction. Here, among light rays incident on the interface between the first input deflector 29 and the first light guide 27, the light ray that is closest to the first output deflector 30 along the x-direction is a first light ray b1.

Furthermore, a light ray that is emitted to the first light guide 27 and totally reflected at the second planar surface S2 to reach the first polarizing beam splitter film 28 is a light ray that, after total reflection, reaches the first output deflector 30 side of the end E1 of the first polarizing beam splitter film 28 at the first input deflector 29 side along the x-direction. Here, among light rays exiting to the first light guide 27 and totally reflected at the first second planar surface S2 to reach the first polarizing beam splitter film 28, the light ray that is closest to the first input deflector 29 along the x-direction is a second light ray b2.

The area in which light rays can be reflected by the first input deflector 29, emitted to the first light guide 27, and totally reflected at the second planar surface S2 in the first light guide 27 to reach the first polarizing beam splitter film 28 is the entire area surrounded by the trajectories of the first light ray b1 and the second light ray b2. At the second planar surface S2, the width Dx in the x-direction of the area surrounded by the trajectories of the first light ray b1 and the second light ray b2 is given by Equation (1).

$$Dx = 2 \times T1 \times \tan(\theta v1_{y0}) \quad (1)$$

In Equation (1), $\theta v1_{y0}$ is the angle of incidence on the second planar surface S2 in the first light guide 27 with respect to the light beam with an object height of zero in the y-direction. T1 is the thickness of the first light guide 27, i.e. the length in the z-direction.

Figure 9:
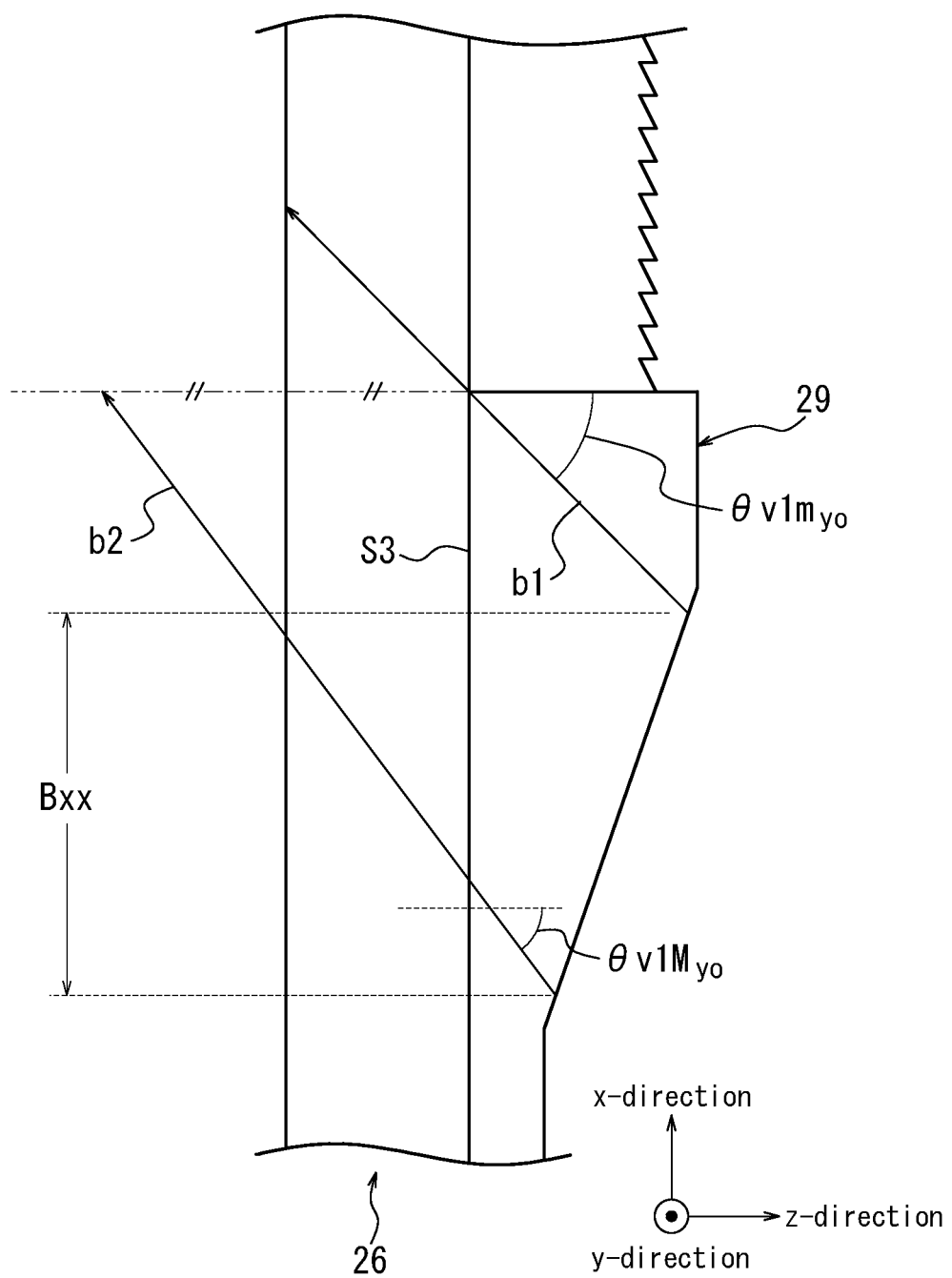
FIG. 9 is an expanded side view of the first optical propagation system in order to illustrate the angle of a light ray that can be emitted by a first output deflector.

At the input side bonded surface S3 of the first input deflector 29, the width Bxx (see FIG. 9) in the x-direction of the area surrounded by the trajectories of the first light ray b1 and the second light ray b2 included in the light beam with the angle of incidence $\theta v1_{y0}$ is given by Equation (2).

$$Bxx = Dx \times \cos(\theta v1_{y0}) = 2 \times T1 \times \sin(\theta v1_{y0}) \quad (2)$$

Figure 10:
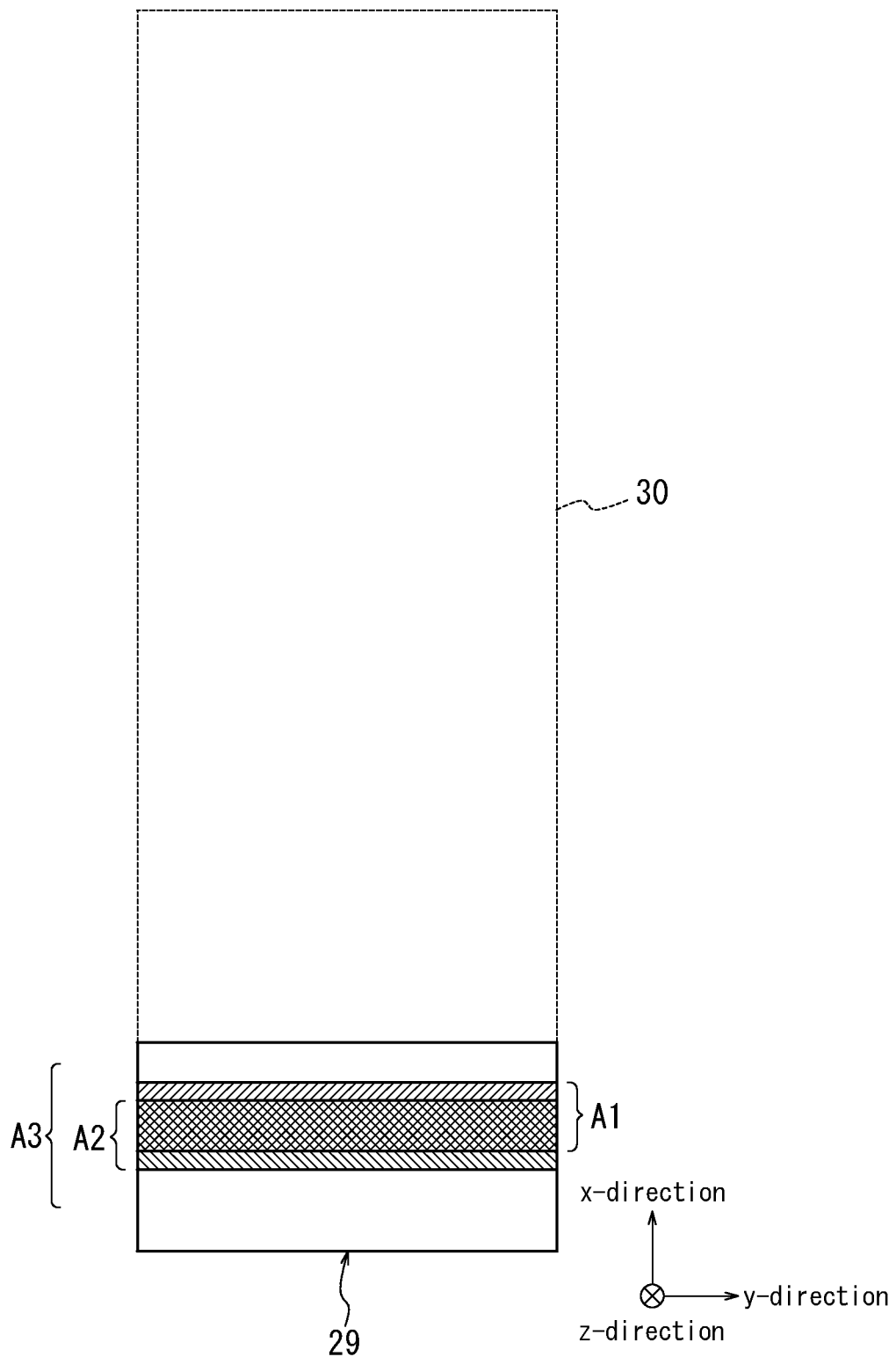
FIG. 10 illustrates, in the first optical propagation system, an area of transmittance, on an input side bonded surface, of a light beam with the minimum angle of incidence and a light beam with the maximum angle on an inclined surface of a first light guide, the light beams being capable of entering the first output deflector.

Depending on the position in the x-direction of the transmissive chart 15, the angle of incidence $\theta v1_{y0}$ in the x-direction varies in accordance with object height. Accordingly, it is preferable for reduction of brightness variation to fill, with the light beams of image light, the area from a first area A1 (see FIG. 10) surrounded by the trajectories of the first light ray b1 and the second light ray b2 included in a light beam with an angle of incidence $\theta v1m_{y0}$ on the input side bonded surface S3, this light beam having the minimum angle of incidence on the inclined surface S4 of the first input deflector 29, and a second area A2 (see FIG. 10)

surrounded by the trajectories of the first light ray b1 and the second light ray b2 included in a light beam with an angle of incidence $\theta v1M_{y0}$ on the input side bonded surface S3 (see FIG. 9), this light beam having the maximum angle of incidence on the inclined surface S4 of the first input deflector 29. In order to satisfy such a condition, the inclined surface S4 preferably opposes a wide area A3 that includes the first area A1 and the second area A2, and the exit pupil is preferably projected over the entire first area A1 and second area A2.

Next, the size of the second input deflector 35 is described below in detail. At the exit pupil copied in the y-direction by the second optical propagation system 26 (see FIG. 8), brightness variation may occur depending on the observation position within the exit area of the fourth planar surface S9 and the angle of image light corresponding to object height in the second optical propagation system 26. In order to reduce brightness variation, as in the first optical propagation system 24, the area in which light can be reflected by the second input deflector 35, emitted to the second light guide 33, and totally reflected at the fourth planar surface S9 in the second light guide 33 to reach the second polarizing beam splitter film 34 is preferably filled by light beams.

Figure 12:
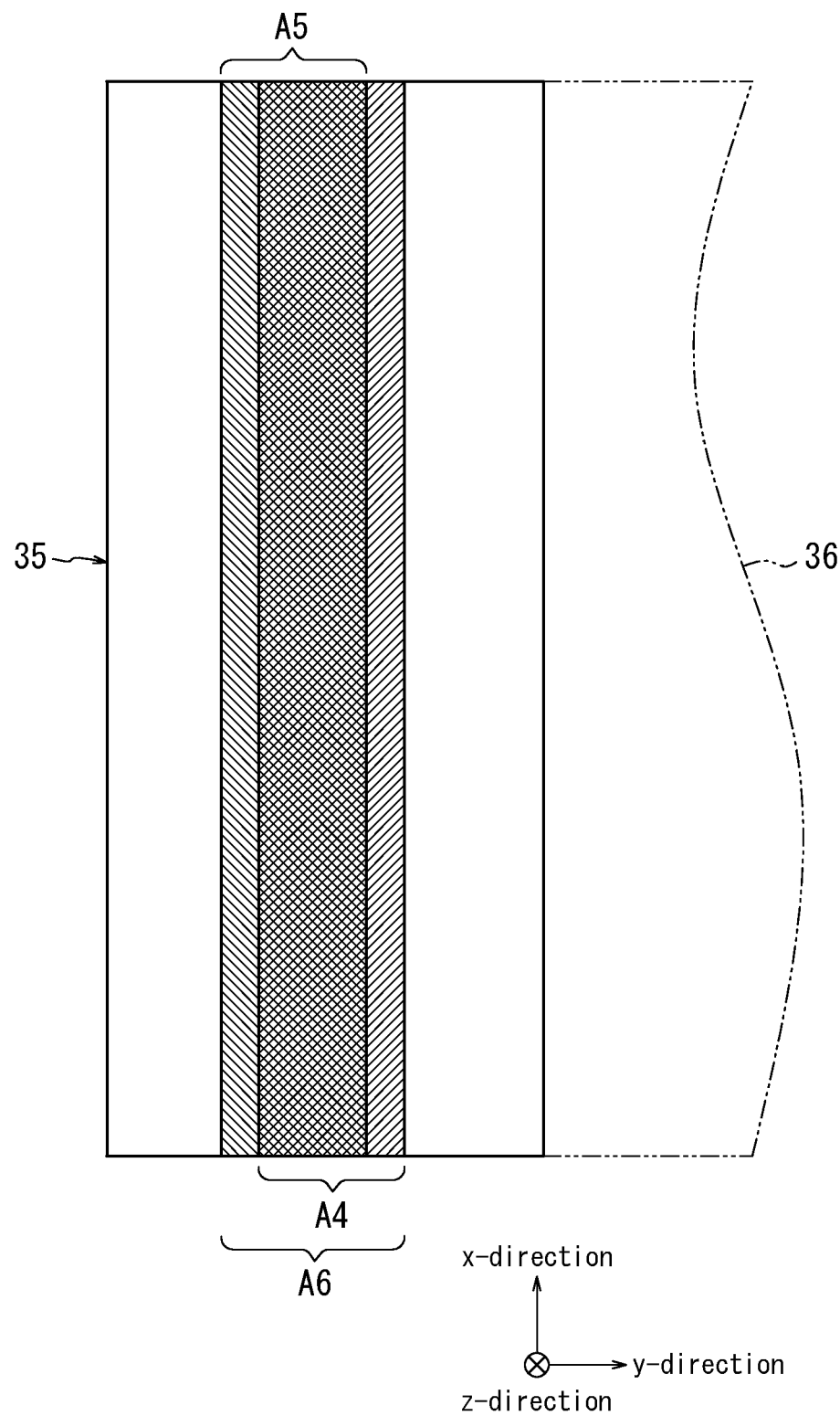
FIG. 12 illustrates, in the second optical propagation system, an area of transmittance, on an input side bonded surface, of a light beam with the minimum angle of incidence and a light beam with the maximum angle on an inclined surface of a second light guide, the light beams being capable of entering the second output deflector.

Like the first input deflector 29, it is preferable for reduction of brightness variation to fill, with the light beams of image light, the area from a first area A4 (see FIG. 12) surrounded by the trajectories of a first light ray b3 and a second light ray b4 included in a light beam with an angle of incidence $\theta h2m_{x0}$ along the y-direction on an input side bonded surface S11, this light beam having the minimum angle of incidence on an inclined surface S10 of the second input deflector 35, and a second area A5 surrounded by the trajectories of the first light ray b3 and the second light ray b4 included in a light beam with an angle of incidence $\theta h2M_{x0}$ on the input side bonded surface S11, this light beam having the maximum angle of incidence on the inclined surface S10 of the second input deflector 35, as illustrated in FIG. 11.

In order to satisfy such a condition, the inclined surface S10 preferably opposes a wide area A6 that includes the first area A4 and the second area A5, and the exit pupil is preferably projected over the entire first area A4 and second area A5.

In order to project the exit pupil over the entire first area A4 and second area A5, the optical image projection system 11, first optical propagation system 24, and second optical propagation system 26 are designed and formed so that the light beam width, in the y-direction, of the image light exiting from the optical image projection system 11 and the length of the first light guide 27 in the y-direction are greater than the length of the second input deflector 35 in the y-direction. The length of the second input deflector 35 in the y-direction is the length of the portion, in the second input deflector 35, that deflects a light ray perpendicular to the fourth planar surface S9 to the second output deflector 36 side, i.e. the length along the inclined surface S10 in the y-direction.

Furthermore, in order to protect the exit pupil over the entire first area A4 and second area A5, the optical image projection system 11, first optical propagation system 24, and second optical propagation system 26 are designed and formed so as to satisfy the following condition.

Figure 13:
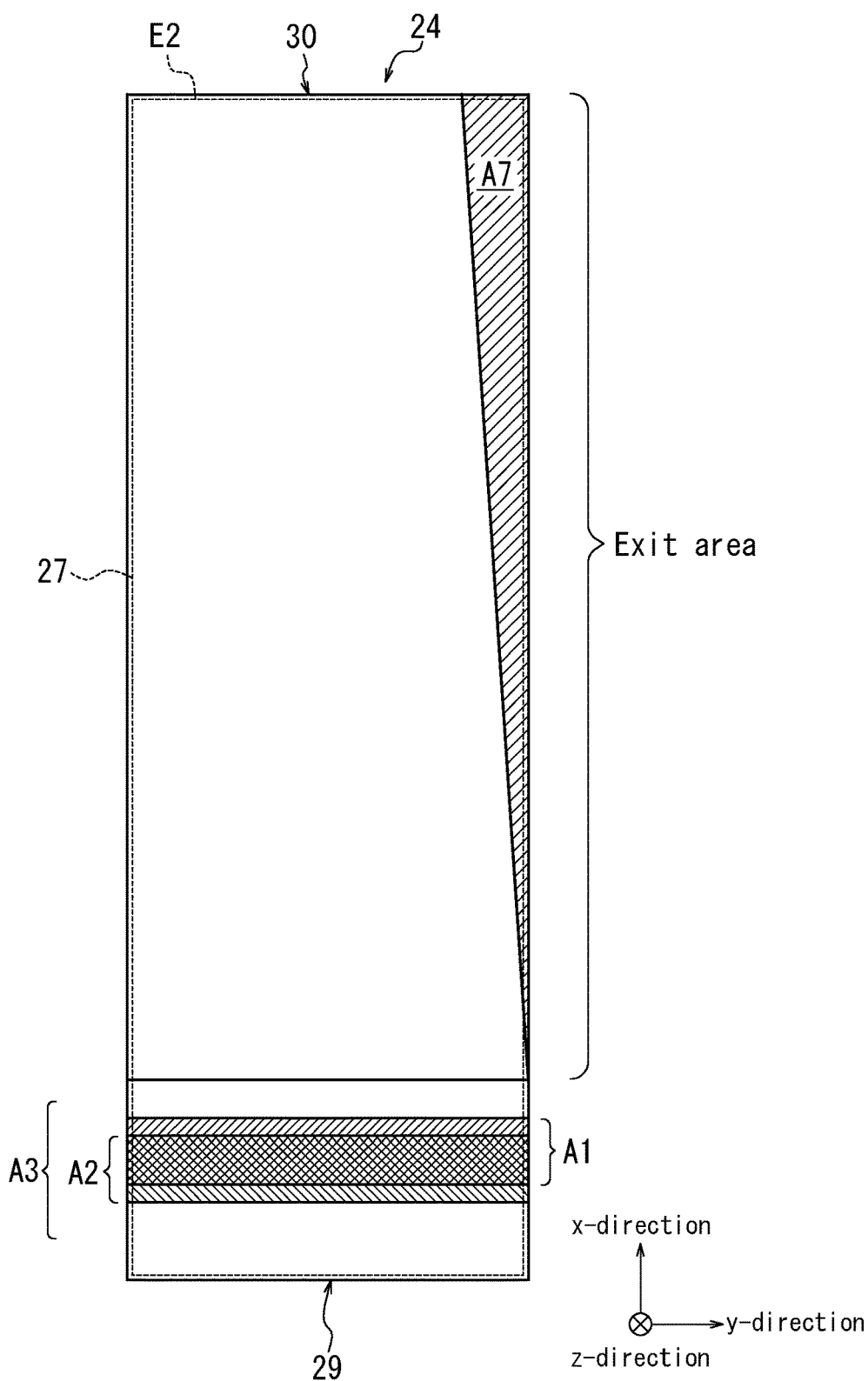
FIG. 13 is a projection, onto a plane perpendicular to the z-direction, of the trajectory of propagation, due to the first light guide, of a light beam having an angular component in the y-direction corresponding to the object height.

Upon a light beam corresponding to a pixel shifted in the y-direction from the optical axis OX in the transmissive chart 15, i.e. a parallel light beam having an angular component in the y-direction corresponding to object height, entering the first optical propagation system 24, the light beam Lx propagates in a direction inclined from the x-direction by an angle corresponding to the angular component and exits from the exit area to the second optical propagation system 26, as illustrated in FIG. 13. Therefore, upon the parallel light beam Lx reaching an end E2 of the first light guide 27 at the first output deflector 30 side, the light beam is not emitted from a portion of the exit area (see reference sign "A7"). Hence, in order to project the exit pupil over the entire first area A4 and second area A5 of the input side bonded surface S11 on the second input deflector 35, the parallel light beam Lx that reaches the end E2 needs to overlap the entire first area A4 and second area A5 of the input side bonded surface S11 on the second input deflector 35. The condition for overlap on both areas is described below.

When a parallel light beam having an angular component in the y-direction corresponding to object height enters the first optical propagation system 24, then a shift S along the y-direction when the light beam reaches the end E2 is calculated by Equation (3), where $\phi$ is the angle between the projection of the center of the light beam onto the second planar surface S2 and a line parallel to the x-direction.

$$S = Wx1 \times \tan \phi \tag{3}$$

Since the first light guide 27 is configured as a parallel flat plate, the propagation angle in the x-direction and y-direction is maintained within the first light guide 27. Therefore, in FIG. 14, a line segment LS1 that is bent back by reflection within the first light guide 27 is artificially extended into a straight line, allowing the shift in the y-direction with respect to the propagation position in the x-direction to be calculated. To simplify the relationship between the shift S and the angle of image light corresponding to object height, the trajectory of the light ray propagated in the x-direction by reflection within the first light guide 27 is extended to a straight line in the following explanation.

The light ray that is at the center of the parallel light beam having an angular component in the y-direction corresponding to object height passes through a start point SP at which the light ray is emitted from the first input deflector 29 into the first light guide 27 and reaches the end E2. The trajectory of the light ray extended into a straight line reaches an end point EP. An apex angle $\theta v1$ at the start point SP of a right triangle (see reference sign "RT1") having a line (see reference sign "L1") with a length of Wx1 extending backward in the x-direction from the end point EP as one side and a line from the start point SP to the end point EP of the trajectory as another side satisfies Equation (4).

$$\sin(\theta v1) = 2 \times \cos \theta \times \cos \phi \times \sin \theta = \cos \phi \times \sin(2 \times \theta) \tag{4}$$

In Equation (4), $\theta$ is the angle between the angular component in the y-direction of the angle of incidence within the first light guide 27 of the angular component in the y-direction corresponding to object height in the image light and a normal to the inclined surface S4 of the first input deflector 29. Furthermore, $\phi$ is the angle between the angular component in the y-direction of the angle of incidence within the first light guide 27 of the angular component in the y-direction corresponding to object height in the image light and a line parallel to the z-direction. In a range over which 4 is small, $\cos \phi$ approaches 1, and therefore $\theta v1$ approaches $\theta$.

An apex angle $\theta h1$ at the start point SP of a right triangle (see reference sign "RT2") having a line (see reference sign "L2") with a length of S extending in the y-direction from the end point EP as one side and a line from the start point SP to the end point EP of the trajectory as another side is the y-direction component of the angle of incidence in the first light guide 27 of the y-direction angular component corresponding to object height in the image light.

The length Wx1 of the first light guide 27 in the x-direction is calculated by Equation (5) using the apex angle θv1 and a line segment connecting the start point SP and the end point EP. Using the apex angle θh1 and a line segment $\overline{AB}$ connecting the start point SP and the end point EP, the shift S is calculated by Equation (6).

$$Wx1 = \overline{AB} \times \sin(\theta v1) \quad (5)$$

$$S = \overline{AB} \times \sin(\theta h1) \quad (6)$$

Accordingly, calculating tan φ (which equals S/Wx1) in Equation (3) by Equations (5) and (6) yields Equation (7).

$$S = Wx1 \times \left[\frac{\sin(\theta h1)}{\sin(\theta v1)}\right] \quad (7)$$

From Equation (7), the shift S depends on the angle corresponding to object height of the image light and increases as θv1 is smaller and/or as θh1 is larger. Accordingly, the maximum shift SM is calculated by Equation (8), where the minimum value of θv1 is θv1m and the maximum value of θh1 is θh1M, θv1 and θh1 being determined by the structure of the transmissive chart 15 and the optical image projection system 11. θv1m corresponds to maximum object height in the x-direction in the image of the transmissive chart 15 and θh1M corresponds to maximum object height in the y-direction in the image of the transmissive chart 15.

$$SM = Wx1 \times \left[\frac{\sin(\theta h1M)}{\sin(\theta v1m)}\right] \quad (8)$$

Figure 15:
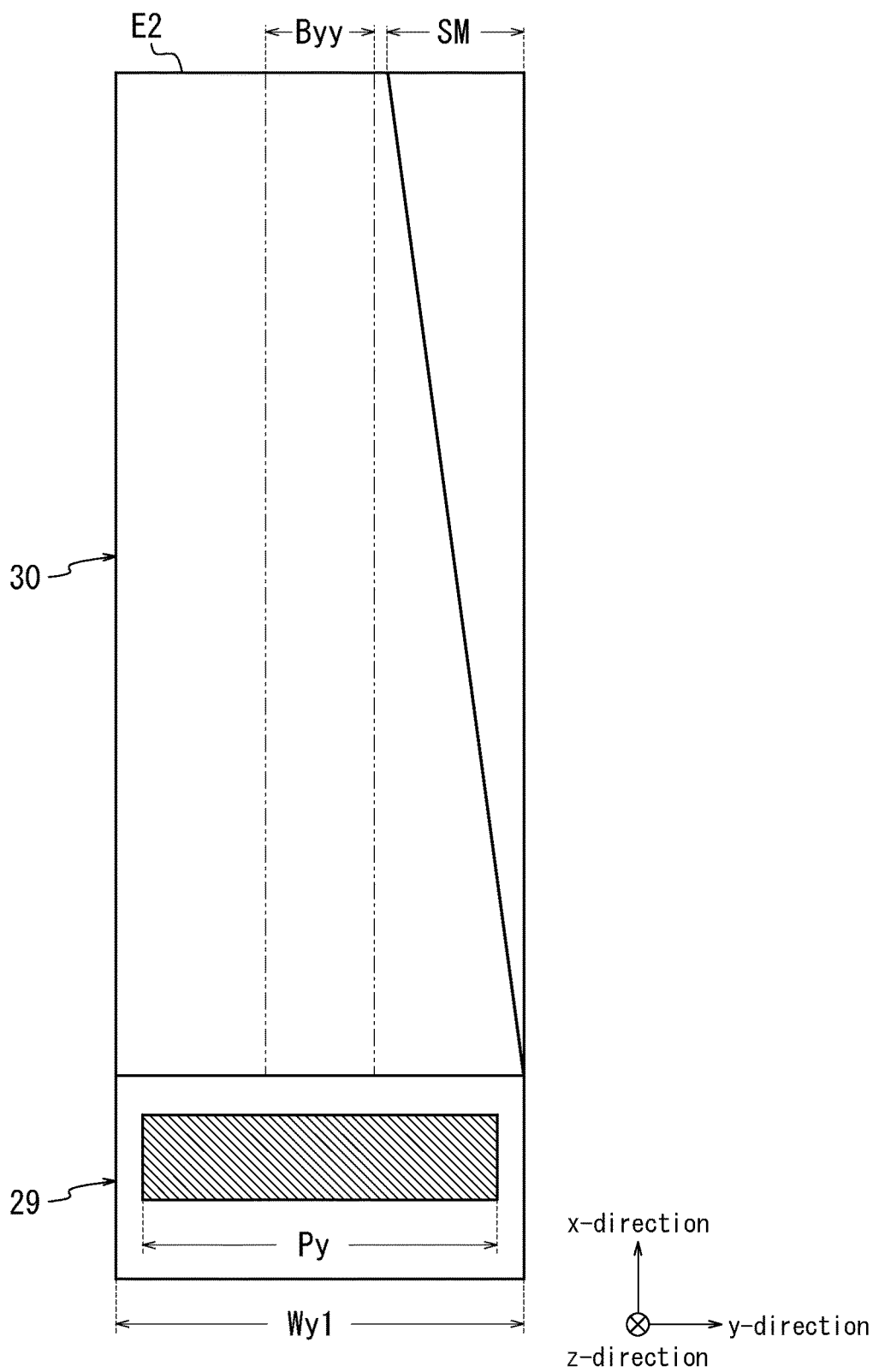
FIG. 15 is a view of the first input deflector and the first output deflector from the z-direction in order to illustrate the size of the second input deflector.

The parallel light beam emitted from the first input deflector 29 to the first light guide 27 shifts at most by SM in both directions along the y-direction at the end E2 by the first output deflector 30 side (see FIG. 15). Accordingly, in order to reduce brightness variation of the image light observed at the exit area of the second optical propagation system 26, Equation (9) is preferably satisfied, where Py is the light beam width in the y-direction of the exit pupil entering the first input deflector 29 and Byy is the width in the y-direction of the area to be filled with light beams incident on the input side bonded surface S11 of the second input deflector 35.

$$Py > Byy + 2 \times SM \quad (9)$$

The length Wy1 of the first optical propagation system 24 in the y-direction is required to satisfy Equation (10) in order to receive light across the entire area of the light beam, which is the light beam width Py in the y-direction.

$$Wy1 > Py > Byy + 2 \times SM \quad (10)$$

Like Bxx in the first optical propagation system 24, Byy is calculated by Equation (11).

$$Byy = 2 \times T2 \times \sin(\theta h2) \quad (11)$$

In Equation (11), T2 is a distance between the third planner surface S8 and the fourth planner surface S9 in the second light guide 33. Further, θh2 is an angular component in the y-direction of an angle of incidence, on the third planar surface S8 and the fourth planar surface S9 in the second light guide 33, of a component of the image light along the optical axis OE of the optical image projection system 11.

Substituting Equations (8) and (11) into Equation (10) yields Equation (12).

$$Wy1 > 2 \times T2 \times \sin(\theta h2) + 2 \times Wx1 \times \left[\frac{\sin(\theta h1M)}{\sin(\theta v1m)}\right] \quad (12)$$

By designing and forming the size of the second input deflector 35 to satisfy Equation (12), brightness variation due to the observation position within the exit area of the fourth planar surface S9 and the angle of image light corresponding to object height in the second optical propagation system 26 can be reduced.

According to the display apparatus of Embodiment 1 with the above-described structure, the light beam width of the image light in the y-direction emitted from the optical image projection system 11 and the length of the first light guide 27 in the y-direction are greater than the length of the second input deflector 35 in the y-direction. Therefore, brightness variation, color variation and change in image contrast in the image light observed from the second optical propagation system 26 can be reduced.

According to the display apparatus of this embodiment, by designing and configuring the optical image projection system 11, first optical propagation system 24, and second optical propagation system 26 to satisfy Equation (12), brightness variation in the image light observed from the second optical propagation system 26 can be further reduced.

According to the display apparatus of this embodiment, the interface between the first input deflector 29 and the first output deflector 30 is colored black, and the first polarizing beam splitter film 28 protrudes slightly to the area of incidence side. Therefore, as described below, stray light with high luminance and the occurrence of brightness variation are suppressed.

In the first optical propagation system 24, only light passing through the first polarizing beam splitter film 28 is allowed to enter into the first output deflector 30, thereby suppressing stray light with high luminance and the occurrence of brightness variation.

Figure 16:
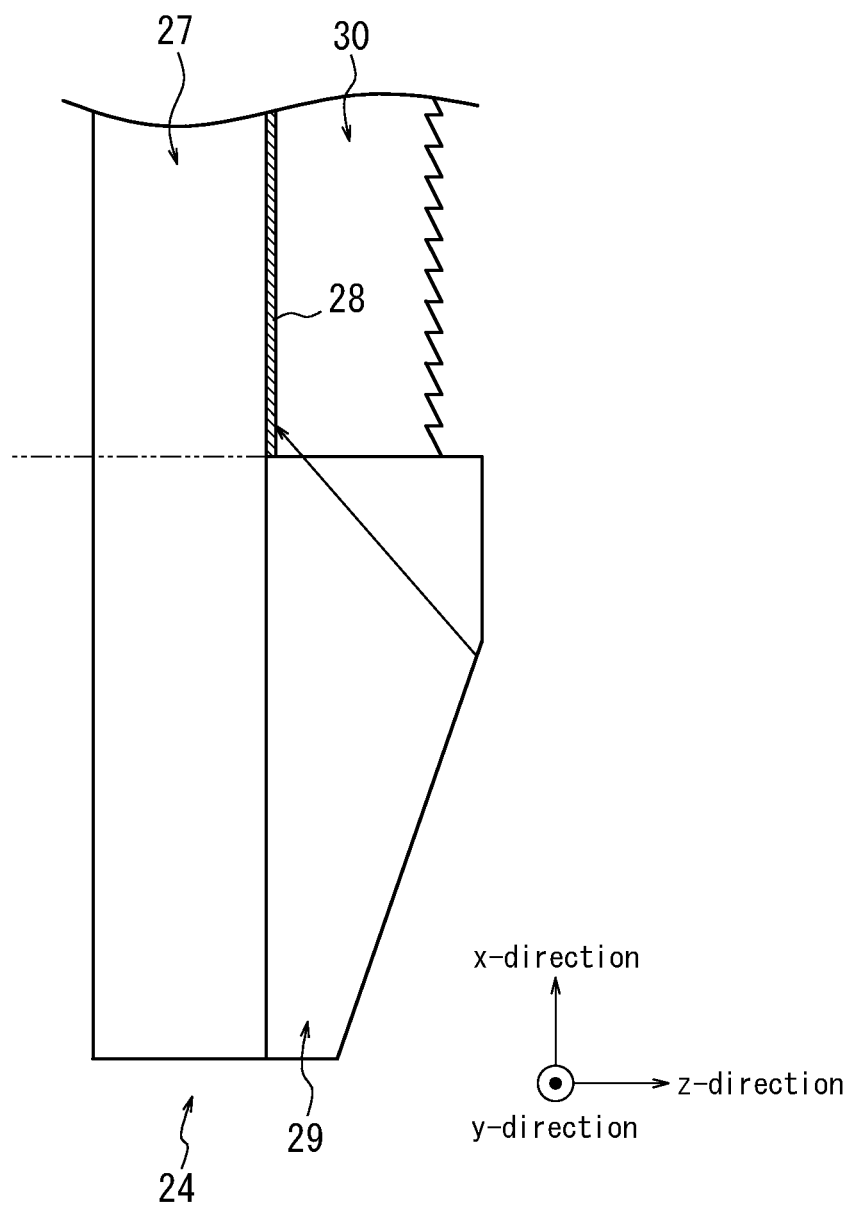
FIG. 16 is an expanded side view of the first optical propagation system configured without application of black coloring for a comparative illustration of the effect of coloring the interface between the first input deflector and the first output deflector black.

Conversely, as illustrated in FIG. 16, when the interface between the first input deflector 29 and the first output deflector 30 transmits light, light can enter directly into the first output deflector 30 from the first input deflector 29 without passing through the first polarizing beam splitter film 28. Therefore, by coloring the interface between the first input deflector 29 and the first output deflector 30 black as in this embodiment, light can be blocked from entering directly into the first output deflector 30 from the first input deflector 29, thereby suppressing stray light with high luminance and the occurrence of brightness variation.

Figure 17:
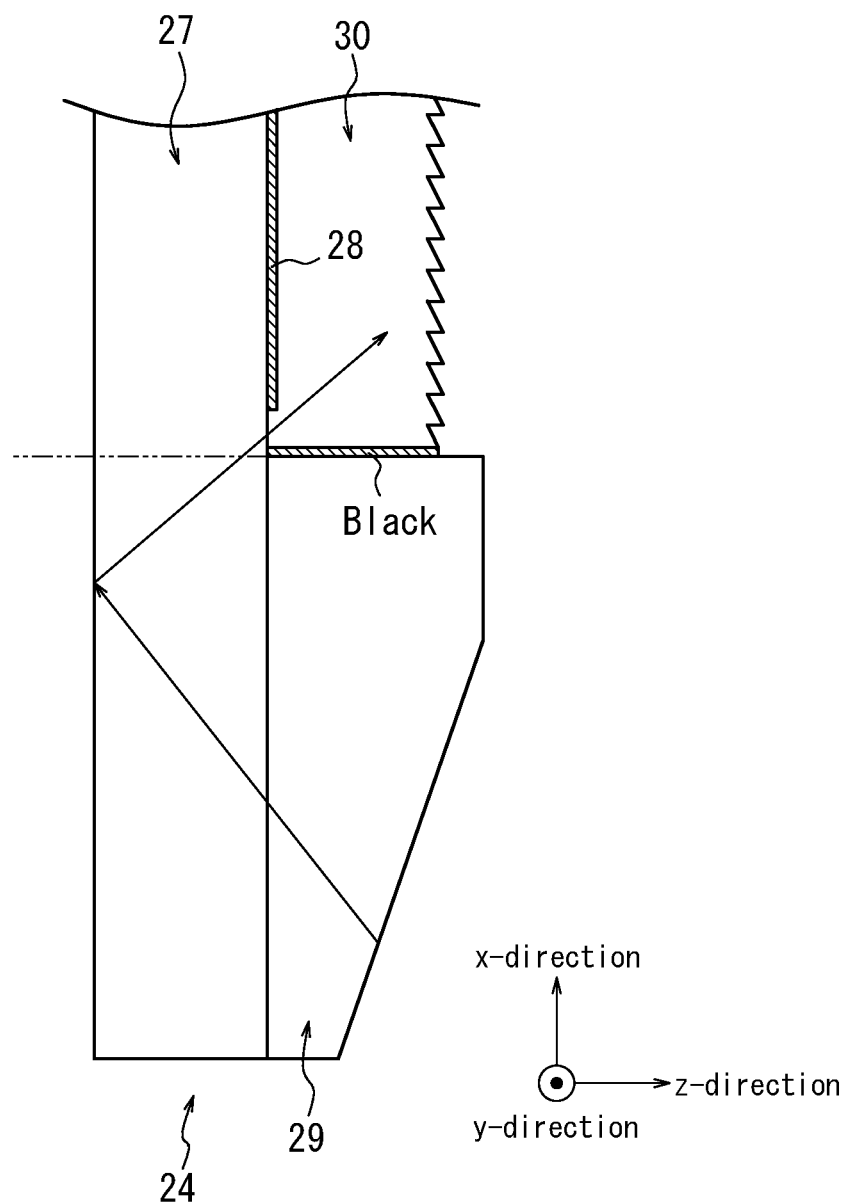
FIG. 17 is an expanded side view of the first optical propagation system in which the first polarizing beam splitter film is not formed at the end of the exit area for a comparative illustration of the effect of causing the first polarizing beam splitter film to protrude slightly to the area of incidence side.

Furthermore, as illustrated in FIG. 17, if there is a gap between the first polarizing beam splitter film 28 and the black painted layer applied to the interface between the first input deflector 29 and the first output deflector 30, light might pass through this gap and enter the first output deflector 30 without passing through the first polarizing beam splitter film 28. Therefore, in this embodiment, causing the first polarizing beam splitter film 28 to protrude slightly to the area of incidence side provides manufacturing tolerance that can reduce the possibility of a gap being formed between the black paint layer and the first polarizing beam splitter film 28 and allows suppression of stray light with high luminance and the occurrence of brightness variation.

According to the display apparatus of this embodiment, the surface that deflects light in the first input deflector 29 is a single inclined surface S4 configured with a single prism. Therefore, obstruction does not occur as it would, due to sidewalls at the first output deflector 30 side of prism elements, among light incident on and reflected by all of the surfaces of prism elements in a prism array such as the one in the first output deflector 30. Therefore, light can be used efficiently. In this embodiment, the width in the x-direction of light entering the first input deflector 29 can also be narrowed by an amount equaling the light beam width at which obstruction occurs in the prism array.

Next, a display apparatus according to Embodiment 2 is described. Embodiment 2 differs from Embodiment 1 in the structure of the first light guide and of the second light guide. The following describes Embodiment 2 focusing on the differences from Embodiment 1. Sections having the same function and structure as in Embodiment 1 are labeled with the same reference signs.

Figure 18:
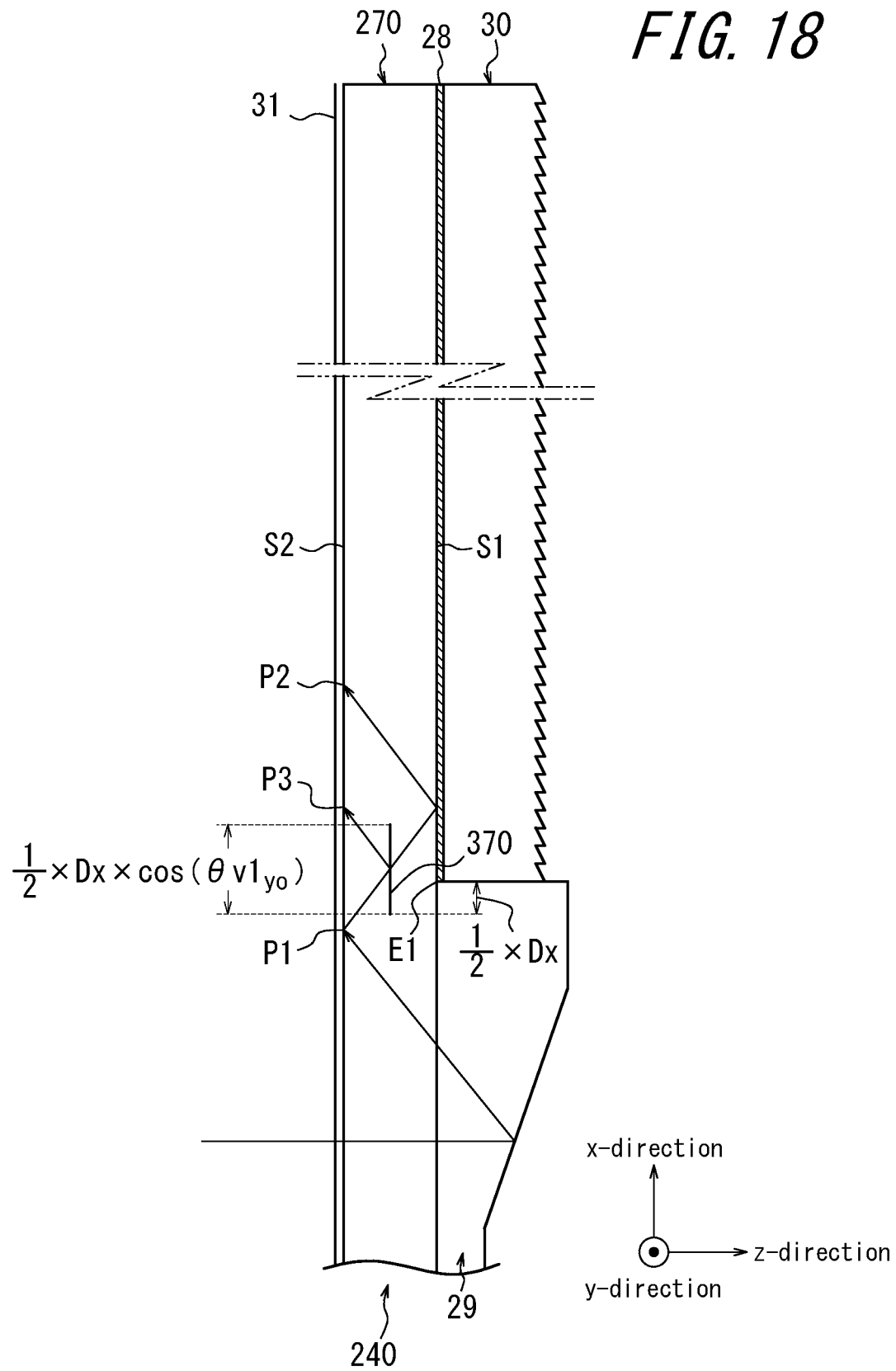
FIG. 18 is a side view of the first optical propagation system in Embodiment 2.

As illustrated in FIG. 18, a first light guide 270 of a first optical propagation system 240 in Embodiment 2 includes a first semi-transparent mirror film 370. The first semi-transparent mirror film 370 has a planar shape parallel to the first planar surface S1 and the second planar surface S2 and is formed near the center of the first light guide 270 in the direction of thickness (the z-direction in FIG. 18). The first semi-transparent mirror film 370 extends to both ends of the first light guide 270 along the width direction (the y-direction in FIG. 18). The first semi-transparent mirror film 370 is formed along the length direction (the x-direction in FIG. 18) so that the end at the first input deflector 29 side is positioned at a distance of ½×Dx from the end E1 of the first polarizing beam splitter film 28 at the first input deflector 29 side. The length of the first semi-transparent mirror film 370 in the length direction (the x-direction in FIG. 18) is ½×Dx×cos($\theta v1_{y0}$).

The first semi-transparent mirror film 370 transmits approximately half of incident light and reflects the remaining half. Accordingly, on the trajectory of a light ray emitted from the first input deflector 29 to the first light guide 270, a portion of the light ray that is reflected without passing through the first semi-transparent mirror film 370 is incident (see reference sign "P3") between the initial position of incidence on the second planar surface S2 (see reference sign "P1") and the position where, after first being reflected at the position of incidence P1 on the second planar surface S2, passing through the first semi-transparent mirror film 370, and being reflected at the first polarizing beam splitter film 28, the light ray is incident on the second planar surface S2 (see reference sign "P2"). Accordingly, in Embodiment 2, the same effect of reducing brightness variation as in Embodiment 1 can be obtained by filling, with light beams, an area that is half the length in the x-direction of the area surrounded by the trajectories of the first light ray b1 and the second light ray b2 included in the light beam with an angle of incidence $\delta v1_{y0}$ on the input side bonded surface S3 of the first input deflector 29 in Embodiment 1. The width B'xx of this area in the x-direction is calculated by Equation (13).

$$B'xx = \tfrac{1}{2} \times Bxx = T1 \times \sin(\theta v1_{y0}) \quad (13)$$

As illustrated in FIG. 19, a second semi-transparent mirror film 380 is also provided in the second optical propagation system 260 in Embodiment 2. As in the first light guide 270, the second semi-transparent mirror film 380 is provided in the second light guide 330. In Embodiment 2, in order to reduce brightness variation in the image light observed at the exit area of the second optical propagation system 260, Equation (14) is preferably satisfied instead of Equation (9).

$$Py > B'yy + 2 \times SM \quad (14)$$

The length Wy1 of the first optical propagation system 240 in the y-direction is required to satisfy Equation (15) in order to receive light across the entire area of the light beam, which is the light beam diameter Py in the y-direction.

$$Wy1 > Py > B'yy + 2 \times SM = T2 \times \sin(\theta h2) + 2 \times Wx1 \times \left[\frac{\sin(\theta h1M)}{\sin(\theta v1m)}\right] \quad (15)$$

In the display apparatus of Embodiment 2 with the above-described structure, as in Embodiment 1, brightness variation in the image light observed from the second optical propagation system 260 can be reduced.

Although this disclosure has been described based on examples and on the accompanying drawings, it is to be noted that various changes and modifications will be apparent to those skilled in the art based on this disclosure. Therefore, such changes and modifications are to be understood as included within the scope of this disclosure.

For example, with the optical image projection system 11 in Embodiment 1 and Embodiment 2, an exit pupil that is longer in the y-direction than in the x-direction is emitted from the optical image projection system 11, but an exit pupil that is longer in the y-direction than in the x-direction may be emitted with a different structure.

Figure 20:
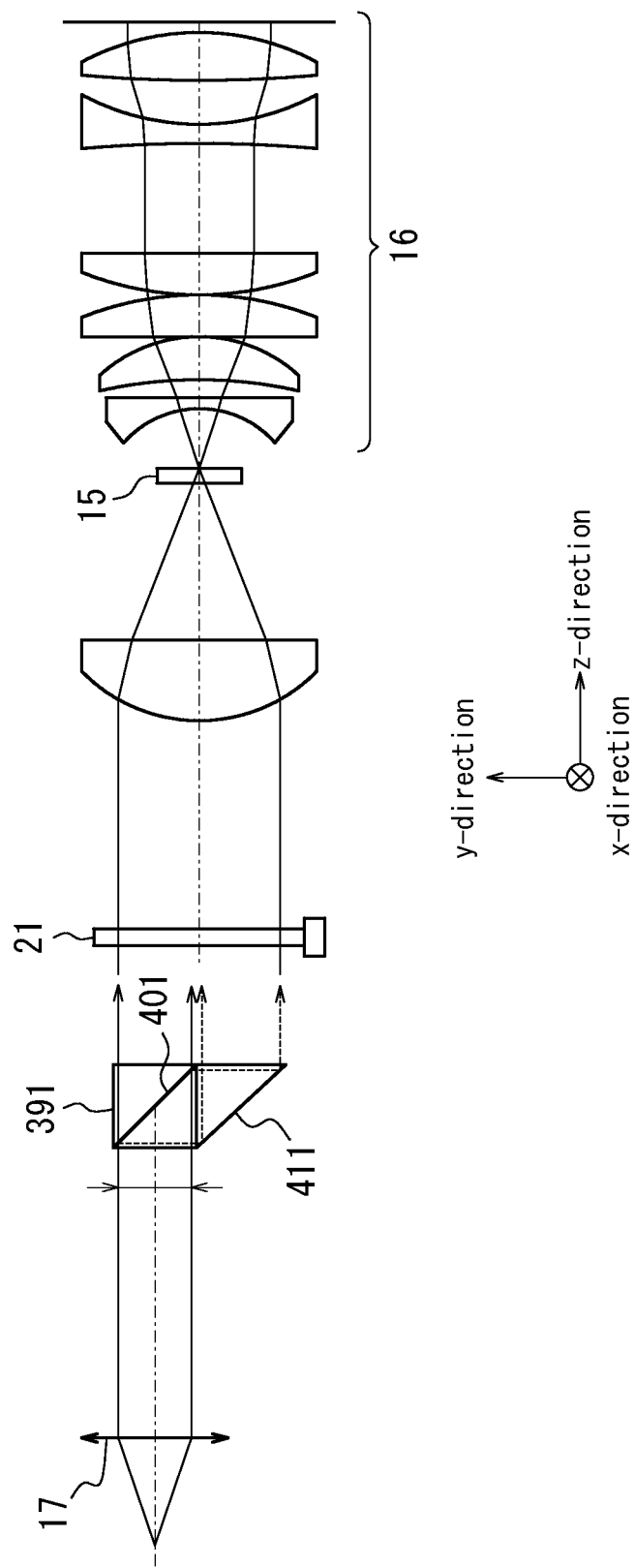
FIG. 20 is a structural diagram illustrating a first modification to the optical image projection system.

For example, as illustrated in FIG. 20, instead of the first lenticular lens and the second lenticular lens, a first optical element 391 may be provided between the collimator lens 17 and the diffuser panel 21. The first optical element 391 includes at least a light ray separation surface 401 and a reflecting surface 411. The first optical element 391 can, for example, be formed by joining a plurality of glass prisms or by holding the light ray separation surface 401 and the reflecting surface 411 in a space. The light ray separation surface 401 is disposed in the first optical element 391 so as to be inclined by 45°, about an axis that is a straight line parallel to the x-direction, relative to a light beam exiting from the collimator lens 17. The light ray separation surface 401 has a transmittance of approximately 50%. Therefore, 50% of the light in a light beam incident on the light ray separation surface 401 is transmitted, whereas 50% of the light is reflected. The reflecting surface 411 is disposed in parallel to the light ray separation surface 401, at a position separated from the light ray separation surface 401 by the length of the diameter of the light beam incident on the first optical element 391 in the direction in which the light beam is reflected by the light ray separation surface 401. Accordingly, the light beam that is reflected by the light ray separation surface 401 is deflected once again by the reflecting surface 411 in a direction parallel to the optical axis OX and is incident on the diffuser panel 21 adjacent in the y-direction to the light beam that passed through the light ray separation surface 401.

As described above, when using the first optical element 391 as well, rectangular illumination light with a wider light beam width in the y-direction than in the x-direction can be irradiated onto the diffuser panel 21 as in Embodiment 1 and Embodiment 2. According to such a configuration, the number of members can be reduced as compared to the optical illumination system 14 of Embodiment 1 and Embodiment 2, thus simplifying the structure. In a modification such as this one, in order to increase the irradiation area on the diffuser panel 21 sufficiently, the collimator lens 17 preferably has a larger focal length than that of the collimator lens 17 used in Embodiment 1 and Embodiment 2.

Figure 21:
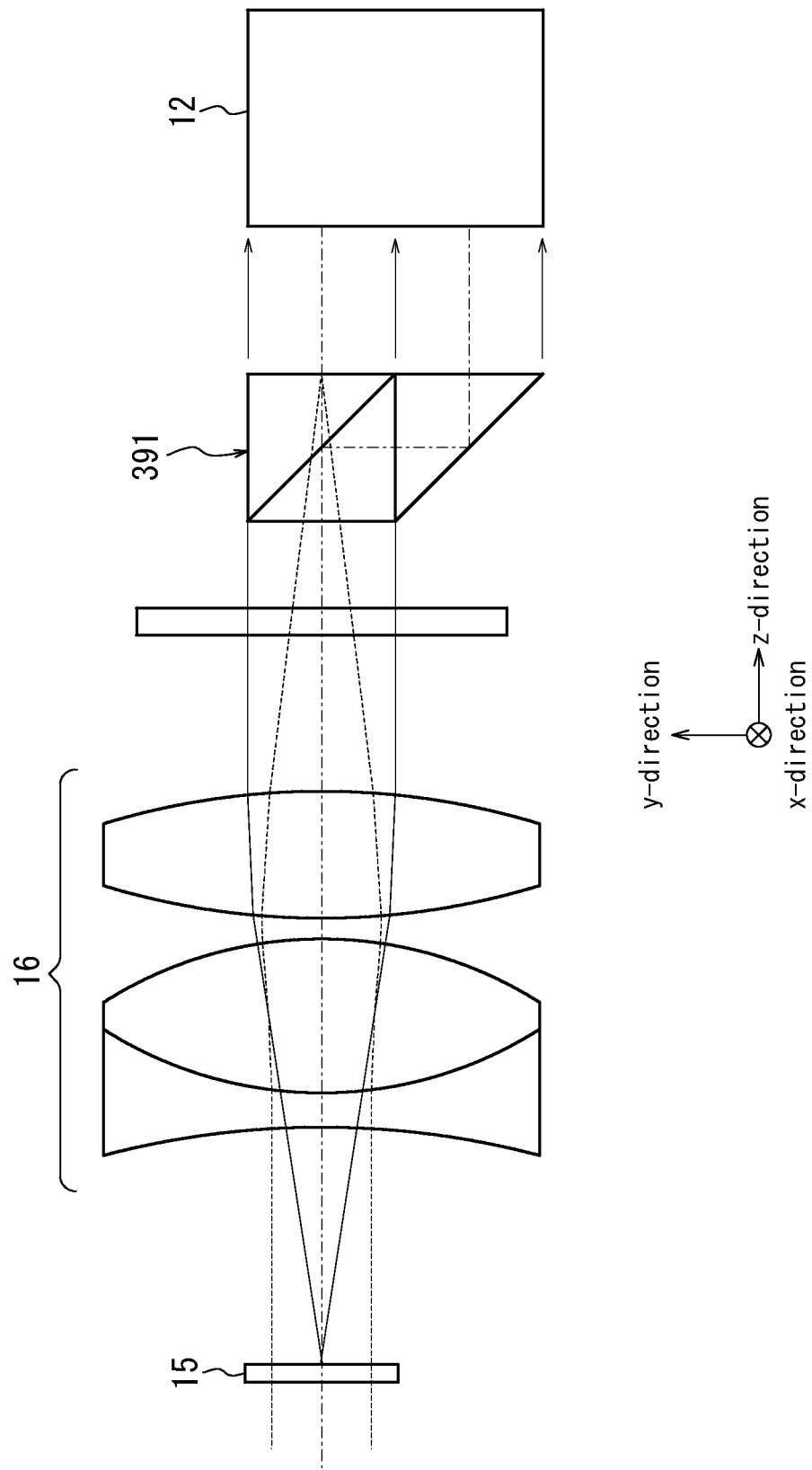
FIG. 21 is a structural diagram illustrating a second modification to the optical image projection system.

The first lenticular lens and the second lenticular lens in the optical illumination system 14 may be omitted, and as illustrated in FIG. 21, the first optical element 391 may be disposed at the exit pupil of the optical projection system 16 between the optical projection system 16 and the pupil enlarging optical system 12. In such a configuration, the area illuminating the diffuser panel 21 may be isotropic with respect to the x-direction and the y-direction. Therefore, the optical system from the light source 13 to the diffuser panel 21 can be simplified. Furthermore, in such a configuration, the light beam diameter is enlarged after exiting the optical projection system 16. Therefore, the F-number of the optical projection system 16 can easily be increased, and the number of lenses used in designing a good optical projection system 16 can be reduced. As described below, a second optical element may be further provided in this configuration.

As illustrated in FIG. 22, a second optical element 422 is an element formed by having the bottoms of two isosceles trapezoid prisms 432a, 432b that are known examples of image rotators face each other with a minute gap therebetween. The second optical element 422 is disposed so that all of the light beams emitted from the first optical element 391 enter the second optical element 422, i.e. so that a light beam passing through the light ray separation surface 401 in the first optical element 391 enters one isosceles trapezoid prism 432a, is reflected by the light ray separation surface 401 and the reflecting surface 411, and then enters the other isosceles trapezoid prism 432b. The second optical element 422 reflects the light beam incident on an inclined surface S12 of each of the isosceles trapezoid prisms 432a, 432b along the y-direction to emit the light beam from another inclined surface S13.

A light beam inclined relative to the optical axis OX of the optical projection system 16 is partially obstructed by the first optical element 391, and therefore the amount of light near the center of width in the y-direction of a light beam enlarged in the y-direction might be reduced. A reduction in the amount of light near the center might ultimately produce brightness variation in the image light enlarged by the pupil enlarging optical system 12. Therefore, by providing the second optical element 422, a reduction in the amount of light near the center due to obstruction can be converted to a reduction in the amount of light at both ends of the width in the y-direction. Hence, brightness variation can be suppressed.

Figure 23:
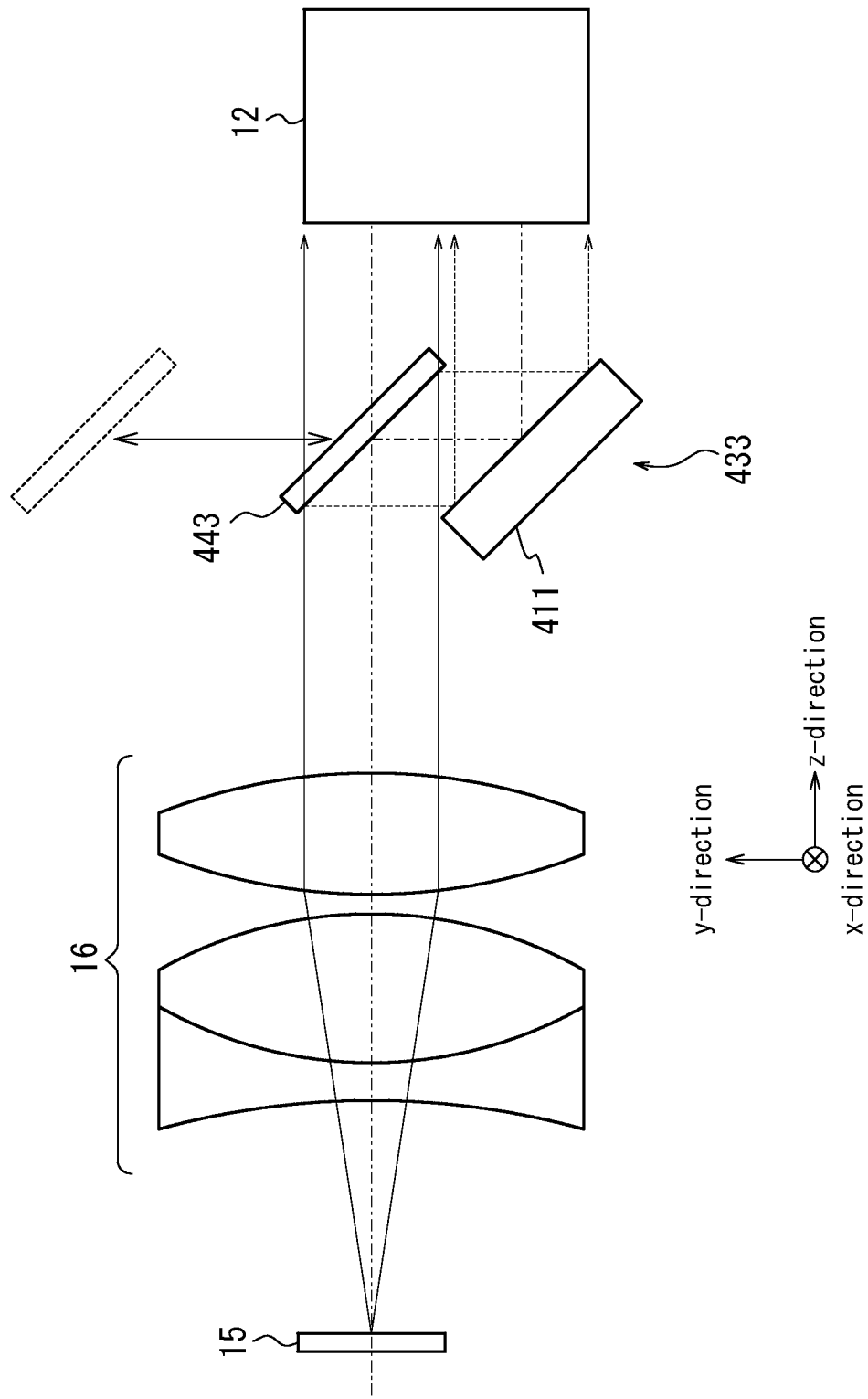
FIG. 23 is a structural diagram illustrating a fourth modification to the optical image projection system.

Instead of the first optical element 391, a third optical element 433 may be used, as illustrated in FIG. 23. Instead of the light ray separation surface 401 of the first optical element 391, a movable reflecting surface 443 that is displaceable in a direction perpendicular to the optical axis OX is used in the third optical element 433. By rapidly switching between inserting and removing the movable reflecting surface 443 from the light beam, rapid expansion in the y-direction can be achieved by time-division. The movable reflecting surface 443 need not be moved physically. For example, an element that can be switched electrically between transmitting and reflecting incident light may be used as the movable reflecting surface 443.

An exit pupil that is longer in the y-direction than in the x-direction can also be emitted without using a transmissive chart. For example, as illustrated in FIGS. 24A and 24B, an optical image projection system 114 can be configured by optically joining the collimator lens 17, a first cylindrical lens 444, a second cylindrical lens 454, the first lens 20, and a deflector 464. The first cylindrical lens 444 and the second cylindrical lens 454 have power respectively in the x-direction and the y-direction. The first cylindrical lens 444 and the second cylindrical lens 454 respectively convert light emitted from the light source 13 into light beams perpendicular in the x-direction and the y-direction. The deflector 464 is disposed so that the converted parallel light beams enter the deflector 464. The deflector 464 is, for example, Liquid Crystal On Silicon (LCOS; a reflective liquid crystal), is driven by a drive circuit (not illustrated), and deflects light in a variety of angles in the x-direction and the y-direction by time-division. By deflecting at high speed, a parallel light beam with an angular component in the x-direction and the y-direction corresponding to object height is emitted. The deflector 464 can also be integrated with the first input deflector 29 in the first optical propagation system 24.

In Embodiment 1 and Embodiment 2, the first polarizing beam splitter film 28 formed on the first planar surface S1 of the first light guides 27 and 270 has the same size as the planar surface of the first output deflector 30, but instead the first polarizing beam splitter film 28 may be longer in the x-direction than the first output deflector 30. In other words, the first polarizing beam splitter film 28 may be formed to exceed the first output deflector 30 in the x-direction on the first input deflector 29 side.

In Embodiment 1 and Embodiment 2, the first optical propagation system 24 is configured so that due to repeated reflection of light in the first optical propagation system 24 using the first polarizing beam splitter film 28 and the first output deflector 30, the light is propagated in the x-direction and deflected to allow a portion of the light to be emitted from the exit area, yet the first optical propagation system 24 is not limited to such a configuration. For example, without providing the first polarizing beam splitter film 28, effects similar to those of this embodiment can be obtained with a configuration in which a portion of light that enters diagonally from the first light guide 27 side at the interface between the first input deflector 29 and the first light guide 27 of the first output deflector 30 is reflected and the remainder is diffracted in a direction perpendicular to the first planar surface S1 and the second planar surface S2. A diffractive surface may be formed directly on the first light guides 27 and 270. In other words, effects similar to those of this embodiment can be obtained with a structure in which a portion of light incident diagonally on the first planar surface S1 is reflected by a diffractive surface and the remainder is diffracted in a direction perpendicular to the first planar surface S1 and the second planar surface S2. In these modifications, the diffractive surface functions as the first output deflector. The same is true for the second optical propagation systems 33 and 330.

In Embodiment 1 and Embodiment 2, the first input deflector 29, first output deflector 30, second input deflector 35, and second output deflector 36 deflect incident light by reflection, but a configuration may be adopted in which incident light is deflected by diffraction.

The invention claimed is:

1. A display apparatus comprising:
an optical image projection system configured to project image light corresponding to an image to infinity;

a plate-shaped first optical propagation system comprising two opposing surfaces, the first optical propagation system being configured to propagate the image light projected from the optical image projection system in an x-direction perpendicular to a direction of an optical axis of the optical image projection system while repeatedly reflecting the image light between the two opposing surfaces and configured to deflect a portion of the image light in a direction substantially perpendicular to one surface of the two opposing surfaces; and a plate-shaped second optical propagation system comprising two opposing surfaces and comprising a second input deflector configured to deflect the image light deflected by the first optical propagation system, the second optical propagation system being configured to propagate the image light deflected by the second input deflector in a y-direction perpendicular to both the direction of the optical axis of the optical image projection system and the x-direction while repeatedly reflecting the image light between the two opposing surfaces and configured to deflect a portion of the image light in a direction substantially perpendicular to one surface of the two opposing surfaces;

wherein:

a light beam width in the y-direction of the image light emitted from the optical image projection system and a length in the y-direction of the first optical propagation system are greater than a length in the y-direction of the second input deflector, the first optical propagation system comprises a first input deflector configured to deflect the image light projected from the optical image projection system, a first light guide formed in a plate-shape comprising a first surface and a second surface that oppose each other, the first light guide being configured to propagate a portion of the image light deflected by the first input deflector in the x-direction perpendicular to the direction of the optical axis of the optical image projection system while repeatedly reflecting a portion of the image light between the first surface and the second surface, and a first output deflector formed on or joined to the first surface and configured to deflect a portion of the image light in a direction substantially perpendicular to the second surface;

the second optical propagation system comprises a second light guide formed in a plate-shape comprising a third surface and a fourth surface that oppose each other, the second light guide being configured to propagate a portion of the image light deflected by the second input deflector in the y-direction perpendicular to both the direction of the optical axis of the optical image projection system and the x-direction while repeatedly reflecting a portion of the image light between the third surface and the fourth surface, and a second output deflector formed on or joined to the third surface and configured to deflect a portion of the image light in a direction substantially perpendicular to the fourth surface; and $$Wy1 \geq 2 \times T2 \times \sin(\theta h2) + 2 \times Wx1 \times \left[\frac{\sin(\theta h1 M)}{\sin(\theta v1m)}\right]$$

is satisfied, where Wx1 is a length of the first light guide in the x-direction, Wy1 is a length of the first light guide in the y-direction, T2 is a distance between the third surface and the fourth surface in the second light guide, θh1M is an angular component in the y-direction of an angle of incidence, on the first surface and the second surface in the first light guide, of a component of the image light corresponding to maximum object height in the y-direction in the image, θv1m is twice an angle between an angular component in the x-direction of an angle of incidence, on the first surface and the second surface in the first light guide, of a component of the image light corresponding to maximum object height in the x-direction in the image and a surface normal to the first input deflector, and θh2 is an angular component in the y-direction of an angle of incidence, on the third surface and the fourth surface in the second light guide, of a component of the image light along the optical axis of the optical image projection system.

2. The display apparatus of claim 1, wherein in a light beam, incident on the first light guide, of the image light corresponding to any pixel forming the image, a light beam width in the y-direction is greater than a light beam width in the x-direction.

3. A display apparatus comprising:

an optical image projection system configured to project image light corresponding to an image to infinity;

a plate-shaped first optical propagation system comprising two opposing surfaces, the first optical propagation system being configured to propagate the image light projected from the optical image projection system in an x-direction perpendicular to a direction of an optical axis of the optical image projection system while repeatedly reflecting the image light between the two opposing surfaces and configured to deflect a portion of the image light in a direction substantially perpendicular to one surface of the two opposing surfaces; and a plate-shaped second optical propagation system comprising two opposing surfaces and comprising a second input deflector configured to deflect the image light deflected by the first optical propagation system, the second optical propagation system being configured to propagate the image light deflected by the second input deflector in a y-direction perpendicular to both the direction of the optical axis of the optical image projection system and the x-direction while repeatedly reflecting the image light between the two opposing surfaces and configured to deflect a portion of the image light in a direction substantially perpendicular to one surface of the two opposing surfaces;

wherein:

a light beam width in the y-direction of the image light emitted from the optical image projection system and a length in the y-direction of the first optical propagation system are greater than a length in the y-direction of the second input deflector, the first optical propagation system comprises a first input deflector configured to deflect the image light projected from the optical image projection system, a first light guide formed in a plate-shape comprising a first surface and a second surface that oppose each other, the first light guide being configured to propagate a portion of the image light deflected by the first input deflector in the x-direction perpendicular to the direction of the optical axis of the optical image projection system while repeatedly reflecting a portion of the image light between the first surface and the second surface, and a first output deflector formed on or joined to the first surface and configured to deflect a portion of the image light in a direction substantially perpendicular to the second surface;

the second optical propagation system comprises a second light guide formed in a plate-shape comprising a third surface and a fourth surface that oppose each other, the second light guide being configured to propagate a portion of the image light deflected by the second input deflector in the y-direction perpendicular to both the direction of the optical axis of the optical image projection system and the x-direction while repeatedly reflecting a portion of the image light between the third surface and the fourth surface, and a second output deflector formed on or joined to the third surface and configured to deflect a portion of the image light in a direction substantially perpendicular to the fourth surface;

the second light guide comprises a semi-transparent mirror inside the second light guide; and $$Wy1 > T2 \times \sin(\theta h2) + 2 \times Wx1 \times \left[\frac{\sin(\theta h1M)}{\sin(\theta v1m)}\right]$$

is satisfied, where Wx1 is a length of the first light guide in the x-direction, Wy1 is a length of the first light guide in the y-direction, T2 is a distance between the third surface and the fourth surface in the second light guide, θh1M is an angular component in the y-direction of an angle of incidence, on the first surface and the second surface in the first light guide, of a component of the image light corresponding to maximum object height in the y-direction in the image, θv1m is twice an angle between an angular component in the x-direction of an angle of incidence, on the first surface and the second surface in the first light guide, of a component of the image light corresponding to maximum object height in the x-direction in the image and a surface normal to the first input deflector, and θh2 is an angular component in the y-direction of an angle of incidence, on the third surface and the fourth surface in the second light guide, of a component of the image light along the optical axis of the optical image projection system.

4. The display apparatus of claim 3, wherein in a light beam, incident on the first light guide, of the image light corresponding to any pixel forming the image, a light beam width in the y-direction is greater than a light beam width in the x-direction.

* * * * *